(12) United States Patent
Ouchi et al.

(10) Patent No.: US 7,068,404 B2
(45) Date of Patent: Jun. 27, 2006

(54) IMAGE COMBINER AND IMAGE DISPLAY DEVICE

(75) Inventors: Yumiko Ouchi, Tokyo (JP); Kenji Hori, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/043,718

(22) Filed: Jan. 26, 2005

(65) Prior Publication Data

US 2005/0248818 A1 Nov. 10, 2005

Related U.S. Application Data

(63) Continuation of application No. PCT/JP2003/009429, filed on Jul. 25, 2003.

(30) Foreign Application Priority Data

Aug. 5, 2002 (JP) ............................. 2002-226791

(51) Int. Cl.
*G09G 5/00* (2006.01)
(52) U.S. Cl. .......................... 359/15; 359/13; 359/630; 345/7
(58) Field of Classification Search ................ 359/15, 359/13, 16, 30
See application file for complete search history.

(56) References Cited

U.S. PATENT DOCUMENTS 6,816,132 B1 * 11/2004 Tanijiri et al. ................ 345/7

2001/0038361 A1 11/2001 Tanjiri et al.

FOREIGN PATENT DOCUMENTS

| JP | 11-064781 A | 3/1999 |
|---|---|---|
| JP | 2000-121989 A | 4/2000 |
| JP | 2000-352689 A | 12/2000 |
| JP | 2001-264682 A | 9/2001 |
| JP | 2002-258488 A | 9/2002 |

OTHER PUBLICATIONS

*Related* U.S. Appl. No. 11/032,202, filed Jan. 10, 2005; Inventor: Yuiko Ouchi; Title: Image Combiner and Image Display Unit.

* cited by examiner

*Primary Examiner*—Fayez G. Assaf
(74) *Attorney, Agent, or Firm*—Frishauf, Holtz, Goodman & Chick, P.C.

(57) ABSTRACT

An image combiner causes light from an image display element to be superimposed on light that is transmitted through a plate-form part positioned in front of the eye of a user. The light from the image display element reaches the eye of the user after being diffracted and reflected by a reflective type HOE inside the plate-form part. The HOE has a third-order or higher phase conversion action that depends on the position on the hologram plane. The distance Rd (calculated in air) between the light source that is on the side of the eyes of the observer during end-use (of the two light sources used to expose the HOE during the manufacture of the HOE) and the HOE is substantially greater than the distance Pd (calculated in air) between the exit pupil of the image combiner and the HOE.

12 Claims, 20 Drawing Sheets

IMAGE COMBINER AND IMAGE DISPLAY DEVICE

This is a continuation of PCT International Application No. PCT/JP2003/009429 filed on Jul. 25, 2003, which is hereby incorporated by reference

TECHNICAL FIELD

The present invention relates to an image combiner which makes it possible for the user to view an image based on light from the front such as the outside world and a display image that is superimposed on this first image, and an image display device such as a head-mounted display using this image combiner.

BACKGROUND ART

In the past, for example, the image display devices disclosed in Japanese Patent Application Kokai No. 2000-352689, Japanese Patent Application Kokai No. 2001-264682, and Japanese Patent Application Kokai No. 2000-121989 have been known as so-called see-through type head-mounted image display devices (head-mounted displays) which allow the user to view a display image superimposed on a view of the outside world while observing the conditions of this outside world. Furthermore, Japanese Patent Application Kokai No. 2001-264682 discloses not only a see-through type head-mounted image display device, but also an image display device that is not used as a see-through type device (i.e., that conducts only light from an image display element to the eyes of the user without superimposing other light from the outside world or the like on this light from the image display element) while having substantially the same construction as such a see-through type device; an example in which this image display device is contained in the flipper part of a portable telephone is also disclosed.

In these image display devices, a reduction in size and weight is achieved by using a reflective type holographic optical element (the holographic optical element may be abbreviated as "HOE" in some cases in this specification). Such a reflective type holographic optical element is superior in terms of wavelength selectivity, and can selectively diffract and reflect only light in an extremely limited wavelength region. Accordingly, in cases where a see-through type image display device is constructed, loss of the amount of light that is transmitted from the outside world or the like by means of a reflective type holographic optical element can be conspicuously reduced.

Furthermore, in these image display devices, the exit pupil of the image combiner is formed so that this pupil substantially coincides with the pupil of the eye of the user in the use state, and a reflective type holographic optical element in these image display devices is manufactured so that the position of one light source (the reference light source) of the two light sources that are used to expose the reflective type holographic optical element during the manufacture of this element is caused to coincide substantially with the position of the exit pupil of the image combiner (paragraph No. 25 of Japanese Patent Application Kokai No. 2000-352689, paragraph No. 37 of Japanese Patent Application Kokai No. 2001-264682, and paragraph No. 27 of Japanese Patent Application Kokai No. 2000-121989). In these patent applications, the following effect is described: by using a reflective type holographic optical element which is manufactured with the position of the reference light source during manufacture disposed in such a position, the exposure light during manufacture and the observation light during use substantially coincide, so that the diffraction efficiency of the reflective type holographic optical element during use can be improved to the maximum extent (paragraph No. 25 of Japanese Patent Application Kokai No. 2000-352689, paragraph No. 37 of Japanese Patent Application Kokai No. 2001-264682, and paragraph No. 27 of Japanese Patent Application Kokai No. 2000-121989).

The reflective type holographic optical element is manufactured by causing two coherent light beams to interfere, and by recording the interference fringes on an emulsion or the like. Furthermore, when end-use illuminating light is caused to be incident at the same wavelength from the light source position of one of the two light beams, there is a diffractive effect such as that of a diffraction grating in the recorded interference fringes, so that a wave front equivalent to that of the other incident light is produced.

Specifically, when interference fringes are recorded with a wave front having a free curved surface being created in one light beam during exposure, and with a purely spherical wave or the like being formed in the other light beam, a wave front with a complex free curved surface can be produced by simple illumination.

A reflective type holographic optical element can thus be endowed with a phase conversion action having such a free curved surface; accordingly, especially if a reflective type holographic optical element endowed with a third-order or higher phase conversion action that depends on the position on the surface of the hologram is used in an image combiner, an image with good quality in which various types of aberration are corrected can be obtained even if the other surfaces are all constructed as planar or spherical surfaces, etc. The reflective type holographic optical elements used in the image combiners described in the respective patent publications mentioned above have a third-order or higher phase conversion action that depends on the position on the surface of the hologram.

When a reflective type holographic optical element is manufactured, it is necessary to actually manufacture a wave front that is equivalent to the phase conversion action defined at the time of design.

Methods that can be used for this include methods in which a wave front is manufactured using a computer generated hologram (CGH), and methods that use a non-spherical lens. However, methods using a CGH suffer from the following demerit (among others): the order number of the non-spherical phase term is limited by the influence of quantization error. Meanwhile, methods using a non-spherical lens suffer from the following demerit (among others): even if the design is simple, a compromise in terms of precision is necessary during actual manufacture. Accordingly, design using a plurality of spherical lenses is the current practice.

FIG. 21 shows the hologram exposure optical system described in Japanese Patent Application Kokai No. 2000-121989. The main exposure lens constituting this exposure optical system is constructed from five spherical lenses, and has an extremely complex disposition with four axes. Furthermore, the position of the first light source (light source on the side of the eye of the observer during playback) in FIG. 21 substantially coincides with the position of the exit pupil of the image combiner.

In the conventional image display device described above, as is also seen from FIG. 21, it is necessary to create an aspherical wave using an extremely complex eccentric lens when the hologram is exposed. In this conventional image display device, although it may be said that a spherical lens that easily allows the required precision to be obtained is used when the hologram is exposed, the number of parts required is large; accordingly, the tolerance for the individual parts is strict, and since the axial eccentricity is large (four axes), optical adjustment is difficult. Consequently, the tolerance must be restricted solely by the precision of the fittings, etc., that support the lens. Accordingly, manufacture is difficult, and a compromise must also be made in terms of the finishing precision.

DISCLOSURE OF THE INVENTION

The present invention was devised in the light of such circumstances; it is an object of the present invention to provide an image combiner and an image display device using this image combiner which make it possible to simplify the exposure optical system used to expose the hologram while allowing a reduction in size and weight by using a reflective type holographic optical element, and which therefore allow easy manufacture and make it possible to obtain desired optical characteristics with good precision.

As a result of research performed by the present inventor, it was ascertained that the reason that the exposure optical system used to manufacture the reflective type holographic optical element in the conventional image display device described above was extremely complicated was as follows: since the position of the reference light source defining the reflective type holographic optical element (the light source on the side of the eyes of the observer during playback) substantially coincided with the position of the exit pupil of the image combiner, this reference light source was located in a position close to the reflective type holographic optical element. Furthermore, it was also ascertained that the exposure optical system that is used to manufacture the reflective type holographic optical element becomes simpler as the reference light source that defines the reflective type holographic optical element is disposed in a position that is located further away from the reflective type holographic optical element. This point will be described in detail in the section relating to working configurations.

Accordingly, where Rd is the distance (distance calculated in air) between the reference light source that defines the reflective type holographic optical element and the hologram plane of the reflective type holographic optical element, and Pd is the distance (distance calculated in air) between the exit pupil of the image combiner and the hologram plane, if this distance Rd is set at a value that is substantially greater than the distance Pd, i.e., if the position of the reference light source that defines the reflective type holographic optical element is set at a position that is more distant than the position of the exit pupil of the image combiner, then the exposure optical system used in the manufacture of the reflective type holographic optical element becomes simpler than the conventional image display device described above; therefore, manufacture is facilitated, and desired optical characteristics such as a high-performance image focusing action in which various aberrations are corrected can be obtained with good precision. In particular, in order to simplify the exposure optical system even further, it is desirable that the distance Rd be twice the distance Pd or greater. Furthermore, in order to simplify the exposure optical system even further, it is desirable that the distance Rd be 100 mm or greater.

In order to solve the problems described above, the present invention is based on new knowledge obtained as a result of such research performed by the present inventor.

Specifically, the image combiner constituting the first invention is an image combiner in which a reflective type holographic optical element is installed, and light from image display means and light passing through the main body are superimposed, this image combiner being characterized in that the reflective type holographic optical element has a third-order or higher phase conversion action that depends on the position on the hologram plane, and the distance Rd is substantially greater than the distance Pd where Rd is the distance (distance calculated in air) between the light source located on the side of the eyes of the observer during end-use (of the two light sources that are used to expose the reflective type holographic optical element during the manufacture of this element) and the hologram plane of the reflective type holographic optical element, and Pd is the distance (distance calculated in air) between the exit pupil of the image combiner and the hologram plane of the reflective type holographic optical element.

The image combiner constituting the second invention is the first invention, which is characterized in that the distance Rd is twice the distance Pd or greater.

The image combiner constituting the third invention is the first invention or second invention, which is characterized in that the distance Rd is 100 mm or greater.

The image display device constituting the fourth invention comprises the image combiner of any of the first through third inventions and the image display means, and is characterized in that at least the part that contains the image combiner is mounted on the user during use.

The image display device constituting the fifth invention is an image display device comprising image display means and a light conducting part that conducts light from the image display means to the eyes of the user, this image display device being characterized in that the light conducting part has a reflective type holographic optical element, this reflective type holographic optical element has a third-order or higher phase conversion action that depends on the position on the hologram plane, and the distance Rd is substantially greater than the distance Pd where Rd is the distance (distance calculated in air) between the light source located on the side of the eyes of the observer during end-use (of the two light sources that are used to expose the reflective type holographic optical element during the manufacture of this element) and the hologram plane of the reflective type holographic optical element, and Pd is the distance (distance calculated in air) between the exit pupil of the image combiner and the hologram plane of the reflective type holographic optical element.

The image display device constituting the sixth invention is the fifth invention which is characterized in that the distance Rd is twice the distance Pd or greater.

The image display device constituting the seventh invention is the fifth invention or sixth invention, which is characterized in that the distance Rd is 100 mm or greater.

BEST MODE FOR CARRYING OUT THE INVENTION

Image combiners and image display devices constituting working configurations of the present invention will be described below with reference to the figures.

[First Working Configuration]

Figure 1:
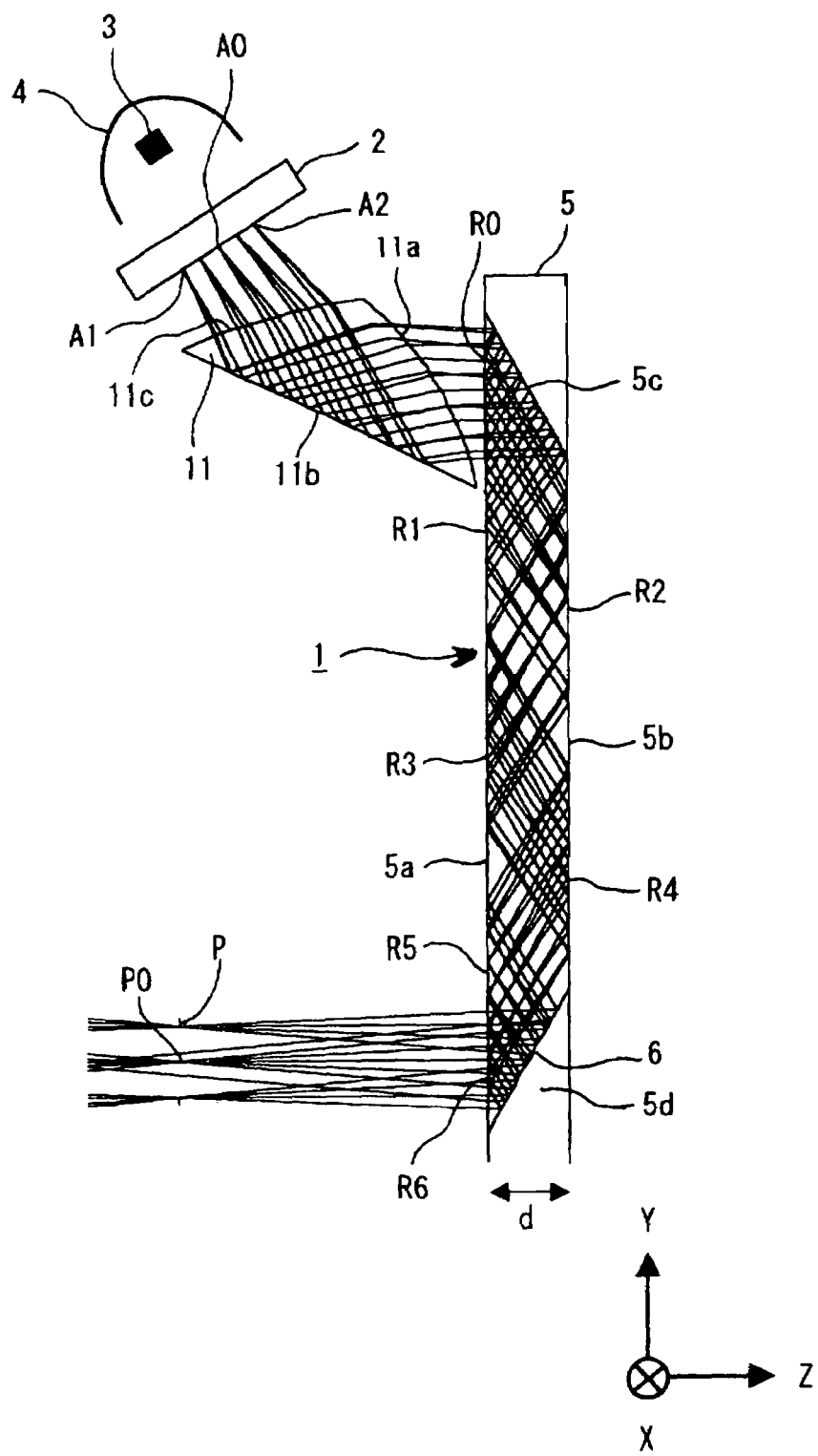
FIG. 1 is a diagram which shows the construction of an image display device constituting a first working configuration of the present invention, and (in schematic terms) the path of the light rays in this image display device.

FIG. 1 is a diagram which shows the construction of an image display device constituting a first working configuration of the present invention, and (in schematic terms) the path of the light rays (only the light rays from the image display element 2) in this image display device.

Here, an X-axis, a Y-axis and a Z-axis that are mutually perpendicular are defined as shown in FIG. 1. Specifically, the left-right direction in the plane of the page in FIG. 1 is taken as the Z-axis, and the direction in which the Z coordinate value increases is defined as "right." The vertical direction in the plane of the page in FIG. 1 is taken as the Y-axis, and the direction in which the Y coordinate value increases is defined as "up." The direction perpendicular to the plane of the page in FIG. 1 is taken as the X-axis, and the system is a right-handed system, i.e., the inward direction from the plane of the page in FIG. 1 is defined as the direction in which the X coordinate value increases. Furthermore, the Y-axis direction may also be caused to coincide with the actual vertical direction, or may be some other appropriate direction. These definitions are also the same for FIG. 15 described later.

The image display device of the present working configuration comprises an image combiner 1 and an image display element 2.

In the present working configuration, a transmitting type LCD is used as the image display element 2. The image display element 2 is illuminated from the back with light source light from a light source consisting of an LED 3 and a reflective mirror 4 such as a parabolic mirror. The light source light is subjected to spatial light modulation, and light indicating the display image is transmitted. Furthermore, it goes without saying that it would also be possible to use some other element such as a reflective type LCD, or to use a self-luminous type element such as an organic EL element, as the image display element 2.

The image combiner 1 comprises a plate-form part 5 which is constructed in the form of parallel flat plates from an optical material such as glass or plastic, and a light conducting part 11 which is constructed from an optical material such as glass or plastic, and which conducts light from the image display element 2 to the plate-form part 5. The plate-form part 5 is not limited to parallel flat plates; for example, this part may have an optical power that is used to correct the visual acuity of the user. In this case, for example, at least one of the two surfaces 5a and 5b of the plate-form part 5 in the direction of the Z-axis is constructed as a curved surface. These points are also the same with respect to the respective working configurations that will be described later. Furthermore, the plate-form part 5 also extends downward in FIG. 1; however, this is omitted from the figure. The light conducting part 11 is formed substantially in the shape of a triangular prism, and has an incident surface 11c consisting of a curved surface on which light from the image display element 2 is incident, a reflective surface 11b consisting of a planar surface that reflects all of the light that is incident from the incident surface 11c, and an emitting surface 11a consisting of a curved surface that emits the light reflected by the reflective surface 11b and causes this light to be incident on the vicinity of the upper part (in FIG. 1) of the surface 5a of the plate-form part 5.

The plate-form part 5 is mounted on the head of the user via a supporting member such as a frame (not shown in the figure) in the same manner as a spectacle lens, and is positioned in front of the eye (not shown in the figure) of the user. In FIG. 1, P indicates an exit pupil for light from the image display element 2 of the image combiner 1, and P0 indicates the center of the exit pupil P. The image combiner 1 is mounted on the user so that this exit pupil P substantially coincides with the pupil of the eye of the user. Accordingly, the center P0 of the exit pupil P substantially coincides with the center of the pupil of the eye of the user. In FIG. 1, the Z-axis direction coincides with the direction of thickness of the plate-form part 5. The eye-side surface 5a and opposite-side surface 5b of the plate-form part 5 are parallel to the XY plane. Furthermore, although this is not shown in the figure, the LED 3, reflective mirror 4, image display element 2 and light conducting part 11 are also supported by the supporting member mentioned above. As a result, the image display element 2 is disposed in a position located above and to the left of the plate-form part 5 within the plane of the page in FIG. 1 so that the observation of the outside world by the user is not impeded, and so that the image display element does not create any hindrance when the user mounts the image display device.

Of course, it would also be possible to dispose the image display element 2 in some other appropriate place, and to conduct the display image to the position of the image display element 2 in FIG. 1 by means of a relay optical system; furthermore, it would also be possible to form an image in space in this position using a scanning optical system. These points are also the same in the respective working configurations described later.

Moreover, in FIG. 1, the points A1 and A2 respectively indicate the positions of both ends of the display part of the image display element 2 within the plane of the page in the figure. Furthermore, the point A0 indicates the center of this display part.

The image combiner 1 is constructed so that the light from the image display element 2 is superimposed on the light (hereafter referred to as "outside world light") that is transmitted through the plate-form part 5 so as to pass through the thickness d of the plate-form part 5 from the front of the plate-form part 5 (i.e., so as to be incident from the surface 5b and emitted from the surface 5a), and is then conducted to the eye of the user.

In the present working configuration, a reflective type holographic optical element (reflective type HOE) 6 is disposed inside the plate-form part 5 in the vicinity of a position that faces the eye of the user in the plate-form part 5. In the present working configuration, the reflective type HOE 6 is inclined by a specified angle in the clockwise direction with respect to the surfaces 5a and 5b as shown in FIG. 1. Furthermore, a reflective surface (mirror) 5c is disposed inside the plate-form part 5 in the vicinity of a position facing the surface 11a of the light conducting part 11 in the plate-form part 5. As is shown in FIG. 1, the reflective surface 5c is inclined by a specified angle in the counterclockwise direction with respect to the surfaces 5a and 5b. Furthermore, light from the image display element 2 does not pass through the portion of the plate-form part 5 located upward at an inclination from the reflective surface 5c in FIG. 1; accordingly, this portion may also be cut. In this case, the reflective surface 5c is disposed on the surface of the plate-form part 5.

In the present working configuration, a small part (small part in the portion on the right side of the reflective type HOE 6 in the plate-form part 5 in FIG. 1) 5d consisting of the same material as the plate-form part 5 is used as a substrate, and a reflective type HOE 6 is manufactured on this part. Afterward, this small part 5d is placed in the mold frame that forms the plate-form part 5, the material of the plate-form part 5 is poured into the mold frame in a molten state, and a reflective type HOE 6 is disposed inside the plate-form part 5 by solidifying this material. Of course, the method used to dispose the reflective type HOE 6 inside the plate-form part 5 is not limited to this method.

The wavelength of the light from the image display element 2 has a wavelength width that includes the wavelength of the diffraction efficiency peak of this reflective type HOE 6, and the major portion of this wavelength width substantially coincides with the wavelength of the diffraction efficiency peak, so that the light from the image display element 2 is reflected by this reflection type HOE 6. On the other hand, the reflective type HOE 6 transmits outside world light (not shown in the figure) without deflecting this light. Furthermore, it is desirable that a reflective type HOE with a high wavelength selectivity be used as the reflective type HOE 6 so that there is as little interference with outside world light as possible. If an reflective type HOE which has respective selectivities for light having three wavelengths of narrow wavelength regions representing the respective colors of R, G and B is used as the reflective type HOE 6, the display image viewed by the user can be colored.

As is shown in FIG. 1, the reflective type HOE 6 has characteristics that reflect the light from the image display element 2 toward the pupil of the observer, and has a third-order or higher phase conversion action that depends on the position on the hologram plane so that there is an image focusing action that corrects various aberrations. The reflective type HOE 6 may be a planar reflective type HOE or a reflective type HOE with a curved surface. In cases where a reflective type HOE with a curved surface is used as the reflective type HOE 6, if the reflective type HOE is disposed so that the curvature center is located on the side of the eyes of the user, the amount of fluctuation in the aberration due to the angle of view caused by the reflective type HOE 6 is small in cases where the angle of view is large; accordingly, this is desirable.

For example, photo-polymers, photo-resists, photochromic materials, photodichromic materials, silver salt emulsions, gelatin bichromate, gelatin dichromate, plastics, ferroelectric materials, magnetic optical materials, electro-optical materials, amorphous semiconductors, photorefractive materials, and the like can be used as the hologram photosensitive material that is used to construct the reflective type HOE 6. Furthermore, the reflective type HOE 6 can be manufactured by simultaneously illuminating such a material with light from two light sources by means of a hologram exposure apparatus of the type shown in FIG. 6, for example, as will be described later.

Light (light of the display image) passing through an arbitrary point on the display part of the image display element 2 enters the inside of the light conducting part 11 from the incident surface 1c of the light conducting part 11. This light is totally reflected by the reflective surface 11b of the light conducting part 11, and is emitted from the emitting surface 11a of the light conducting part 11, so that this light enters the interior of the plate-form part 5 from the region R0 of the surface 5a of the plate-form part 5. The light that enters the interior of the plate-form part 5 from the region R0 is reflected by the reflective surface 5c, and is then incident on the region R1 of the surface 5a of the plate-form part 5 at an angle of incidence that is greater than the critical angle, so that the light is totally reflected by the region R1. This light is incident on the region R2 of the surface 5b of the plate-form part 5 at an angle of incidence that is greater than the critical angle, so that this light is totally reflected by the region R2. This light is then further incident on the region R3 of the surface 5a of the plate-form part 5 at an angle of incidence that is greater than the critical angle, so that this light is totally reflected by the region R3. This light is then further incident on the region R4 of the surface 5b of the plate-form part 5 at an angle of incidence that is greater than the critical angle, so that this light is totally reflected by the region R4. This light is then further incident on the region R5 of the surface 5a of the plate-form part 5 at an angle of incidence that is greater than the critical angle, so that this light is totally reflected by the region R5, and is then incident on the reflective type HOE 6. In this case, this light is subjected to a reflective and diffractive action by the reflective type HOE 6, and an image focusing action arising from the third-order or higher phase conversion action that depends on the position on the hologram plane. Subsequently, this light is emitted to the outside of the plate-form part 5 from the region R6 of the surface 5a of the plate-form part 5. In this case, light leaving from the same place on the image display element 2 is incident on the pupil of the eye of the user placed on the exit pupil P so that an enlarged virtual image is formed at an infinite distance or specified distance (1 m in the concrete examples described later; this distance is also the same in concrete examples of other working configurations described later) from the exit pupil P.

The light that reaches the eye of the user after being emitted from the image display element 2 and diffracted and reflected by the reflective type HOE 6 ordinarily has only a single wavelength region component in accordance with the emission spectrum characteristics of the LED 3 and the wavelength selectivity of the reflective type HOE 6. However, for example, in a case where a white LED is used as the LED 3, and a color reflective type HOE is used as the reflective type HOE 6, the light has a plurality of discrete individual wavelength region components.

Furthermore, a reflective type HOE that is used as the reflective type HOE 6 in the present working configuration is such that the distance Rd is set to be substantially greater than the distance Pd, where Rd is the distance (distance calculated in air) between the light source located on the side of the eyes of the observer during playback (of the two light sources that are used to expose the reflective type HOE 6 (corresponding to the single wavelength region or a single individual wavelength region among the plurality of individual wavelength regions) during the manufacture of this reflective type HOE) and the hologram plane of the reflective type HOE 6, and Pd is the distance (distance calculated in air) between the exit pupil of the image combiner and the hologram plane of the reflective type holographic optical element. It is desirable that the distance Rd be twice the distance Pd or greater. Furthermore, it is desirable that the distance Rd be 100 mm or greater.

Moreover, the distance Rd is not necessarily limited to the distance at which the actually present light source is disposed and the distance of the hologram plane; for example, in cases where an optical system is disposed between the actually present light source and the hologram plane, this distance corresponds to the distance from a position conjugate with the light source to the hologram plane. Furthermore, in cases where a quasi-second-order light source is formed from the light source by means of a condenser lens or a spatial filter, etc., this distance corresponds to the distance from this second-order light source to the hologram plane. Such facts are a matter of common sense to a person skilled in the art.

In the present working configuration, the distance Rd is substantially greater than the distance Pd; accordingly, the exposure optical system used to manufacture the reflective type holographic optical element is simpler than in the conventional image display device described above; accordingly, manufacture is facilitated, and desired optical characteristics such as a high-performance image focusing action in which various types of aberration are corrected can be obtained with good precision. This point will be described later in connection with an investigation of first through sixth concrete examples (described later) of the present working configuration.

[First Concrete Example of First Working Configuration]

Here, a first concrete example of the first working configuration will be described with reference to FIG. 1. In the design of this first concrete example, Code V (commercial product name) manufactured by Optical Research Associates of the United States, a firm that is well known in this technical field, was used as the design program. In this case, the path of the light rays that are emitted from the center A0 of the display part of the image display element 2 and that pass through the center P0 of the exit pupil P is defined as the optical axis of this optical apparatus as a whole. In the present concrete example, the optical axis is not a single straight line, but rather has a shape in which mutually inclined line segments are connected. These points are also the same in the case of the respective second through sixth concrete examples and the concrete example of the second working configuration described later.

The various optical quantities of this first concrete example are as described below.

The diameter of the exit pupil P is 3 mm. The visual field angle in the upward direction within the plane of the page in the figure is 5°. The visual field angle in the downward direction within the plane of the page in the figure is −5°. The visual field angle in the direction of depth of the page is ±6.75°. The screen size in the plane of the page in the figure (i.e., the length between the point A1 and the point A2) is 3.6 mm. The screen size in the direction of depth of the page is 4.8 mm. The thickness d of the plate-form part 5 is 3.4 mm. The wavelength used is the wavelength width from approximately 480 nm to approximately 540 nm. The refractive index nd of the plate-form part 5 with respect to a wavelength of 587.56 nm (d line) is 1.596229, and the Abbe number vd is 40.4.

Figure 2:
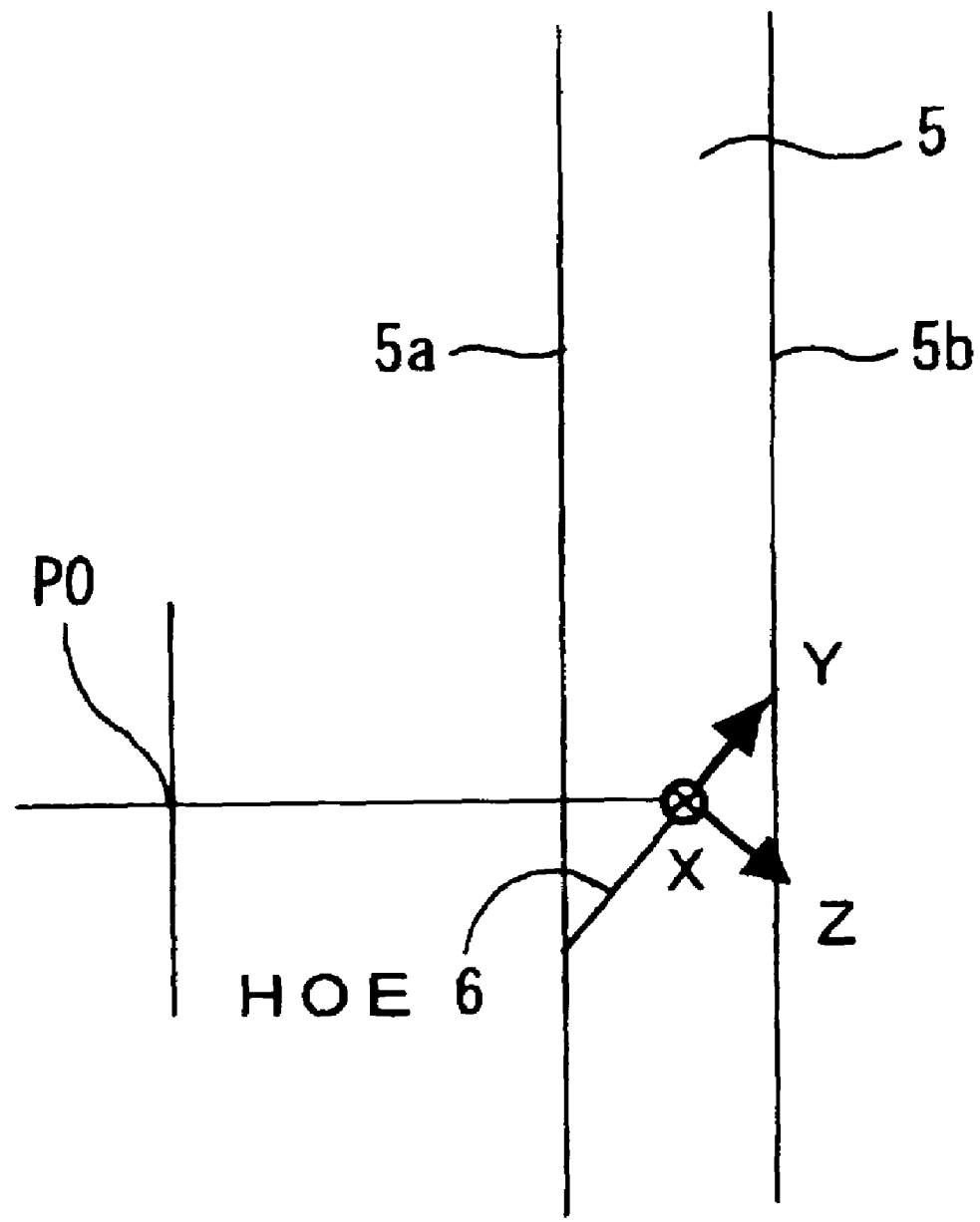
FIG. 2 is a diagram which shows the coordinate system of the two light sources that define the hologram.

Since the HOE 6 is determined by the ±difference of the wave fronts of the two light beams used in exposure, the HOE 6 can be defined by indicating the optical conditions of the two light beams. The coordinates of the first point light source (HV1) are designated as (HX1, HY1, HZ1), and the coordinates of the second point light source are designated as (HX2, HY2, HZ2). As is shown in FIG. 2, these coordinates take the point of intersection of the HOE plane and the optical axis as the origin, and the direction of the optical axis is taken as the Z-axis, the direction of the plane of the page within the HOE plane is taken as the Y-axis, and the direction of depth with respect to the plane of the page is taken as the X-axis, so that these coordinates differ from the coordinates defined in connection with FIG. 1.

Furthermore, the emulsion used to record the hologram had a thickness of 20 μm, a refractive index of 1.493, and a refractive index modulation of 0.03. The exposure wavelength was 532 nm, and the shrinkage rate of the emulsion was assumed to be 2%. Since the fluctuation in the wavelength of the playback light caused by shrinkage was in a proportional relationship, the wavelength was also shortened by 2%, so that the center wavelength of playback was 521.36 nm. The surface of the HOE 6 was a plane with an orientation rotated 29.3° in the clockwise direction in the plane of the page from the same direction as the Y-axis, with the center located 1.7 mm on the right side along the Z-axis from the surface 5a in FIG. 1. In order to optimize the image focusing performance, the HOE 6 had a phase function component corresponding to a third-order or higher phase conversion action that depends on the position on the hologram plane.

To describe the phase function here, the phase function is a function that defines the amount of non-spherical phase conversion other than that defined by the two pure point light sources of the HOE 6; in the optical design program Code V, this can be designated using polynomial coefficients of the X- and Y-axis components or the like.

Furthermore, the various quantities used for ray tracing in this first concrete example are shown in Table 1 below. The order of the optical planes (order of the plane numbers) runs from the plane of the pupil of the eye of the user (=plane of the exit pupil P of the image combiner 1) to the image display element 2. Furthermore, in Table 1, the reference symbols in FIG. 1 corresponding to the respective plane numbers are indicated as "symbols" in parentheses. This point is also the same in tables described later.

TABLE 1

| Plane number (symbol) | Curvature radius | Medium nd | vd | |
|---|---|---|---|---|
| 1 (P) | INFINITY | | | |
| 2 (5a: R6) | INFINITY | 1.596229 | 40.4 | |
| 3 (6) | INFINITY | 1.596229 | 40.4 | Reflective plane |
| Hologram plane: | | | | |
| Definition of two light beams | | | | |
| HV1: REA | HV2: VIR | | | |
| HX1: $0.000000 \times 10^{+00}$ | HY1: $-.173228 \times 10^{+10}$ | HZ1: $-.135831 \times 10^{+10}$ | | |
| HX2: $0.000000 \times 10^{+00}$ | HY2: $0.300000 \times 10^{+06}$ | HZ2: $-.213231 \times 10^{+07}$ | | |
| Phase coefficient | | | | |

TABLE 1-continued

| Plane number (symbol) | Curvature radius | Medium nd | vd | |
|---|---|---|---|---|
| C2: 6.4341 × 10⁻⁰¹ | C3: −1.1210 × 10⁻⁰² | C5: −9.0059 × 10⁻⁰³ | | |
| C7: −1.3958 × 10⁻⁰⁴ | C9: −7.0582 × 10⁻⁰⁵ | C10: 4.8900 × 10⁰⁶ | | |
| C12: 5.9881 × 10⁻⁰⁶ | C14: 3.7963 × 10⁻⁰⁶ | C16: −6.3066 × 10⁻⁰⁶ | | |
| C18: −1.5310 × 10⁰⁶ | C20: −6.8667 × 10⁻⁰⁶ | C21: 3.0656 × 10⁻⁰⁶ | | |
| C23: 4.3271 × 10⁻⁰⁶ | C25: 5.9772 × 10⁻⁰⁸ | C27: 1.4296 × 10⁻⁰⁶ | | |
| C29: 1.7262 × 10⁻⁰⁷ | C31: −1.9135 × 10⁻⁰⁶ | C33: −2.4034 × 10⁻⁰⁶ | | |
| C35: 1.0147 × 10⁻⁰⁶ | C36: −4.3191 × 10⁰⁷ | C38: −2.6873 × 10⁻⁰⁷ | | |
| C40: 3.4866 × 10⁻⁰⁷ | C42: 1.0228 × 10⁰⁶ | C44: −5.5562 × 10⁻⁰⁷ | | |
| C46: −1.2622 × 10⁻⁰⁹ | C48: 1.5068 × 10⁻⁰⁷ | C50: 2.6807 × 10⁻⁰⁷ | | |
| C52: 2.7379 × 10⁻⁰⁷ | C54: −6.8986 × 10⁻⁰⁸ | C55: 1.8862 × 10⁻⁰⁸ | | |
| C57: 1.0718 × 10⁻⁰⁹ | C59: −2.1626 × 10⁻⁰⁸ | C61: −1.3252 × 10⁻⁰⁷ | | |
| C63: −9.6312 × 10⁻⁰⁸ | C65: 4.7721 × 10⁻⁰⁸ | | | |
| 4 (5a: R5) | INFINITY | 1.596229 | 40.4 | Reflective plane |
| 5 (5b: R4) | INFINITY | 1.596229 | 40.4 | Reflective plane |
| 6 (5a: R3) | INFINITY | 1.596229 | 40.4 | Reflective plane |
| 7 (5b: R2) | INFINITY | 1.596229 | 40.4 | Reflective plane |
| 8 (5a: R1) | INFINITY | 1.596229 | 40.4 | Reflective plane |
| 9 (5c) | INFINITY | 1.596229 | 40.4 | Reflective plane |
| 10 (5a: R0) | INFINITY | | | |
| 11 (11a) | −13.40165 | 1.596229 | 40.4 | |
| 12 (11b) | −278.57144 | 1.596229 | 40.4 | Reflective plane |
| 13 (11c) | −25.94668 | 1.596229 | 40.4 | |
| 14 (2) | INFINITY | | | |

The definition of the phase function used in Table 1 expresses the optical path difference to which the light rays incident on a point designating the HOE as a position on the XY coordinate plane are subjected as a value that is normalized by the wavelength used; if m and n are assumed to be integers, then this is determined by designating polynomial coefficients expressed by Equation (1) in general form shown below. Up to 65 such coefficients can be designated; in order, these are called C1, C2, C3, . . . , C65, and when the order of the coefficients is expressed by integers j, then a correspondence is established so that the relationship expressed by Equation (2) shown below holds true between the integers m and n that indicate the order numbers of the X coordinates and Y coordinates. Specifically, in the present example, the phase function is defined by the polynomial equation of Equation (3) shown below. Such a definition of the phase function is also the same for tables described later.

$$\sum_{m=0}^{10}\sum_{n=0}^{10} C_{mn} X^m Y^n, \text{ where } C_{mn} = 0 \quad (1)$$

$$j = \frac{(m+n)^2 + m + 3n}{2} \quad (2)$$

$$C1X + C2Y + C3X^2 + c4XY + \ldots + C65Y^{10} \quad (3)$$

Furthermore, with regard to the positional relationship of the respective optical planes in the present concrete example, the absolute positions of the centers of the respective optical planes with the center of the first plane (plane No. 1=symbol P in FIG. 1) taken as the origin (X, Y, Z)=(0, 0, 0), and the amounts of rotation of these planes about the X-axis (values measured with the counterclockwise direction taken as the positive direction), are shown in Table 2 below.

TABLE 2

| Plane No. (symbol) | X coordinate value | Y coordinate value | Z coordinate value | Rotational angle about X axis [degree] |
|---|---|---|---|---|
| 1 (P) | 0.00000 | 0.00000 | 0.00000 | 0.0000 |
| 2 (5a: R6) | 0.00000 | 0.00000 | 13.00000 | 0.0000 |
| 3 (6) | 0.00000 | 0.00000 | 14.70000 | −29.3000 |
| 4 (5a: R5) | 0.00000 | 4.00000 | 13.00000 | 0.0000 |
| 5 (5b: R4) | 0.00000 | 8.00000 | 16.40000 | 0.0000 |
| 6 (5a: R3) | 0.00000 | 14.00000 | 13.00000 | 0.0000 |
| 7 (5b: R2) | 0.00000 | 20.00000 | 16.40000 | 0.0000 |
| 8 (5a: R1) | 0.00000 | 25.00000 | 13.00000 | 0.0000 |
| 9 (5c) | 0.00000 | 28.00000 | 14.80000 | 29.0000 |
| 10 (5a: R0) | 0.00000 | 30.00000 | 13.00000 | 0.0000 |
| 11 (11a) | 0.00000 | 26.54141 | 11.80000 | 22.5054 |
| 12 (11b) | 0.00000 | 26.66663 | 6.87716 | 64.5054 |
| 13 (11c) | 0.00000 | 30.75393 | 3.07182 | 106.9387 |
| 14 (2) | 0.00000 | 33.97663 | 1.83499 | 121.7187 |

With regard to the first light source (light source located on the side of the eyes of the observer during playback) of the HOE 6 in this concrete example, the distance from the origin of the HOE plane was 2.2×10⁹ in the third quadrant of the yz coordinates in FIG. 2 (from HX1:0, HY1: 0.214385×10⁺⁰⁸, HZ1:0.155769×10⁺⁰⁸).

Furthermore, the two light sources of the HOE 6 are defined in air; accordingly, in a case where the HOE 6 during playback is disposed in a medium, the distances are calculated with a correction made for the refractive index, and are compared. In this first concrete example, the distance (distance calculated in air) Rd from the HOE 6 to the first light source is 2.2×10⁹ mm, and is thus more or less infinity. On the other hand, the distance of the plane of the HOE 6 from the pupil plane of the exit pupil P is 14.7 mm. However, 1.7 mm of this distance is located in a medium with a refractive index of approximately 1.6; accordingly, the length converted for air is 1.06 mm, so that the distance (calculated in air) Pd from the HOE 6 to the pupil plane of the exit pupil P is 14.06 mm.

Figure 3:
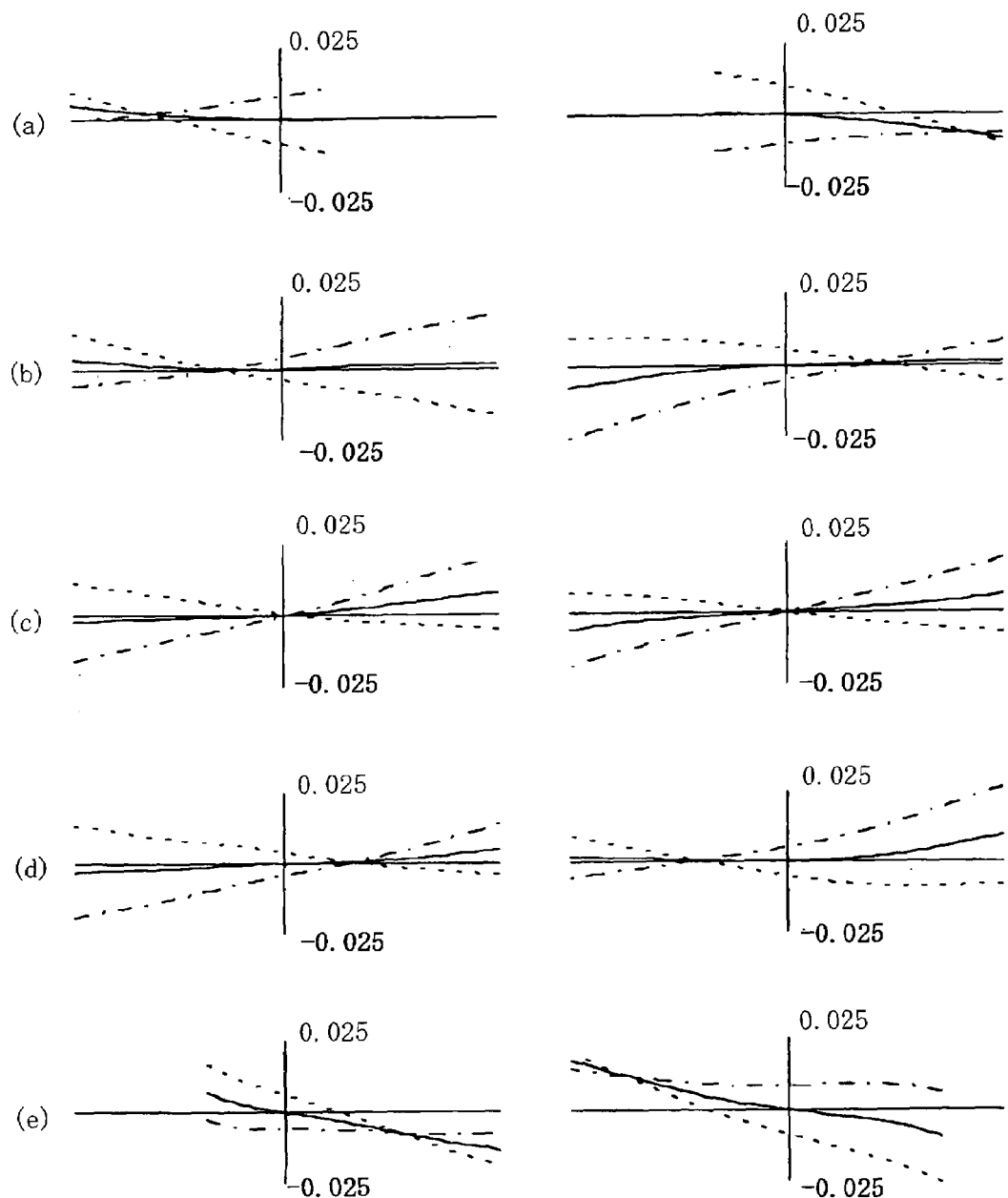
FIG. 3 is a lateral aberration diagram based on the design values of an image display device constituting a first concrete example of the first working configuration of the present invention. (a) indicates a case in which the angle of view (X, Y)=(−6.66°, 5.00°), (b) indicates a case in which the angle of view (X, Y)=(−3.33°, 2.50°), (c) indicates a case in which the angle of view (X, Y)=(0.00°, 0.00°), (d) indicates a case in which the angle of view (X, Y)=(3.33°, −2.50°), and (e) indicates a case in which the angle of view (X, Y)=(6.66°, −5.00°). The figures on the left side indicate lateral aberration in the Y direction, and the figures on the right side indicate lateral aberration in the X direction. Furthermore, the solid lines indicate light with a wavelength of 521.36 nm, the broken lines indicate light with a wavelength of 531.36 nm, and the one-dot chain lines indicate light with a wavelength of 511.36 nm.

Here, FIG. 3 shows a lateral aberration diagram used to express the image focusing performance of the optical system of the image display device constituting the present concrete example in a case where it is assumed that the actual HOE 6 maintains the design values defined in Table 1 "as is." Here, the lateral aberration values for the center wavelength of 521.36 nm and the wavelengths of 531.36 nm and 511.36 nm which are wavelengths of ±10 nm with respect to this center wavelength are shown simultaneously in one diagram. It is seen from FIG. 3 that in a case where the HOE 6 has the characteristics of the design values, there is little lateral chromatic aberration throughout the entire region of the angle of view, so that the image focusing performance is superior.

Figure 4:
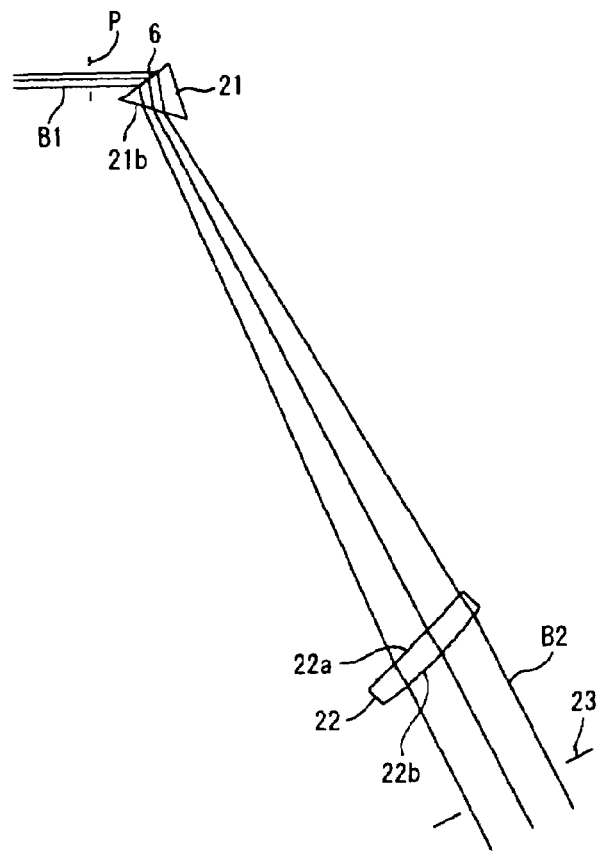
FIG. 4 is an optical path diagram showing the essential parts of the exposure optical system that is used to expose the reflective type holographic optical element in the image display device constituting a first concrete example of the first working configuration of the present invention.
Figure 5:
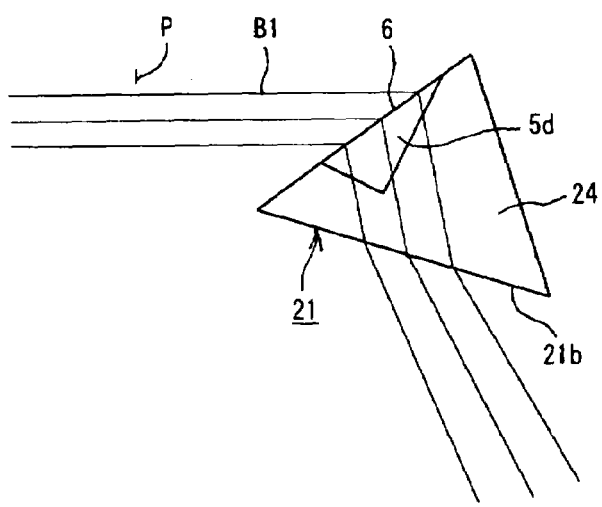
FIG. 5 is an enlarged diagram of the prism in the optical system shown in FIG. 4.
Figure 6:
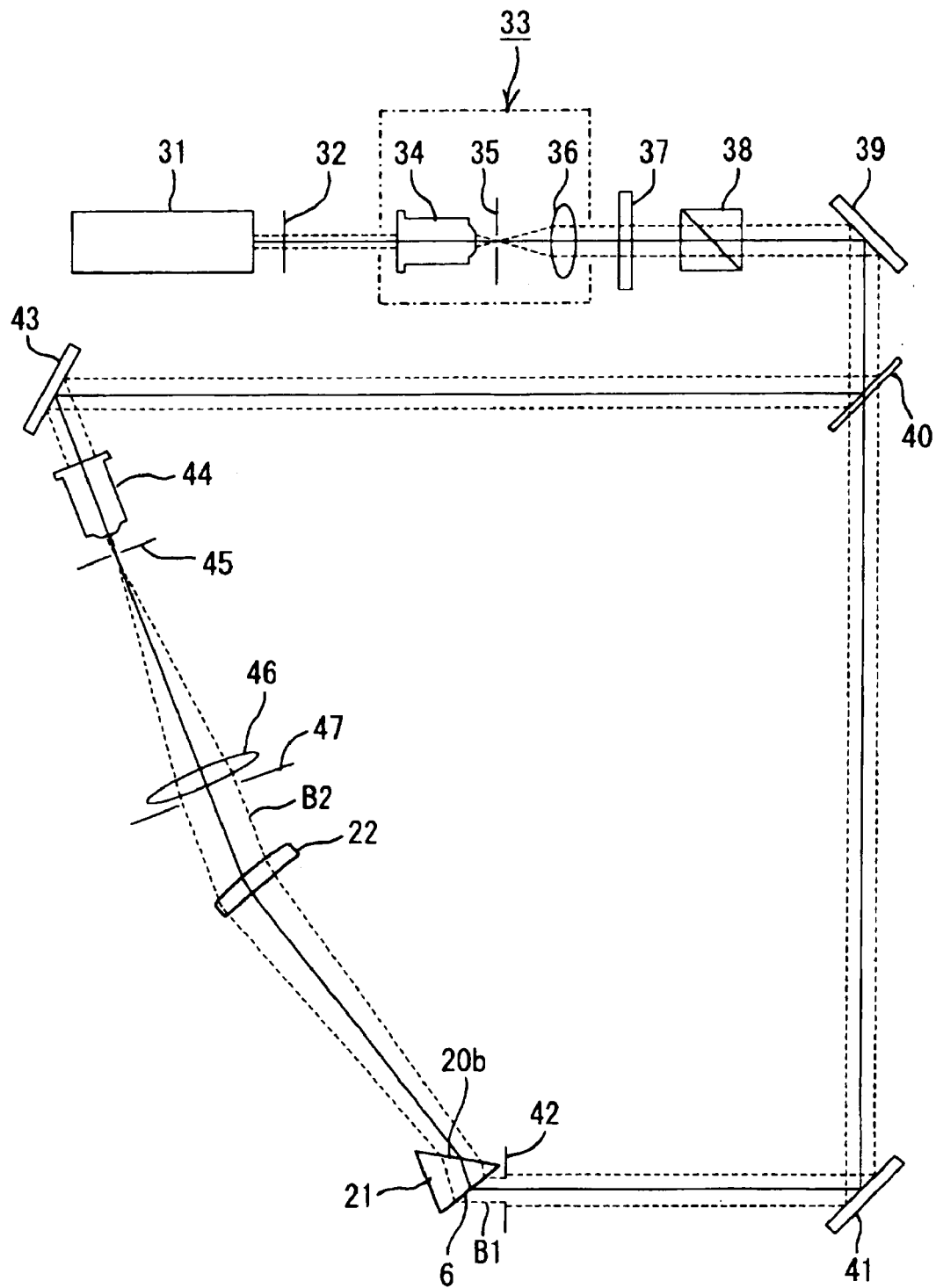
FIG. 6 is a schematic structural diagram showing one example of a hologram exposure apparatus using the optical system shown in FIG. 4.

Here, an exposure optical system was designed which was used when the reflective type HOE 6 defined in Table 1 was actually manufactured. FIG. 4 shows an optical path diagram of the essential parts of this exposure optical system. FIG. 5 is an enlarged view of the prism 21 in the optical system shown in FIG. 4. Furthermore, FIG. 6 shows a schematic structural diagram of one example of the hologram exposure apparatus that exposes the reflective type HOE 6 during the manufacture of the reflective type HOE 6 using the optical system shown in FIG. 4.

Figure 21:
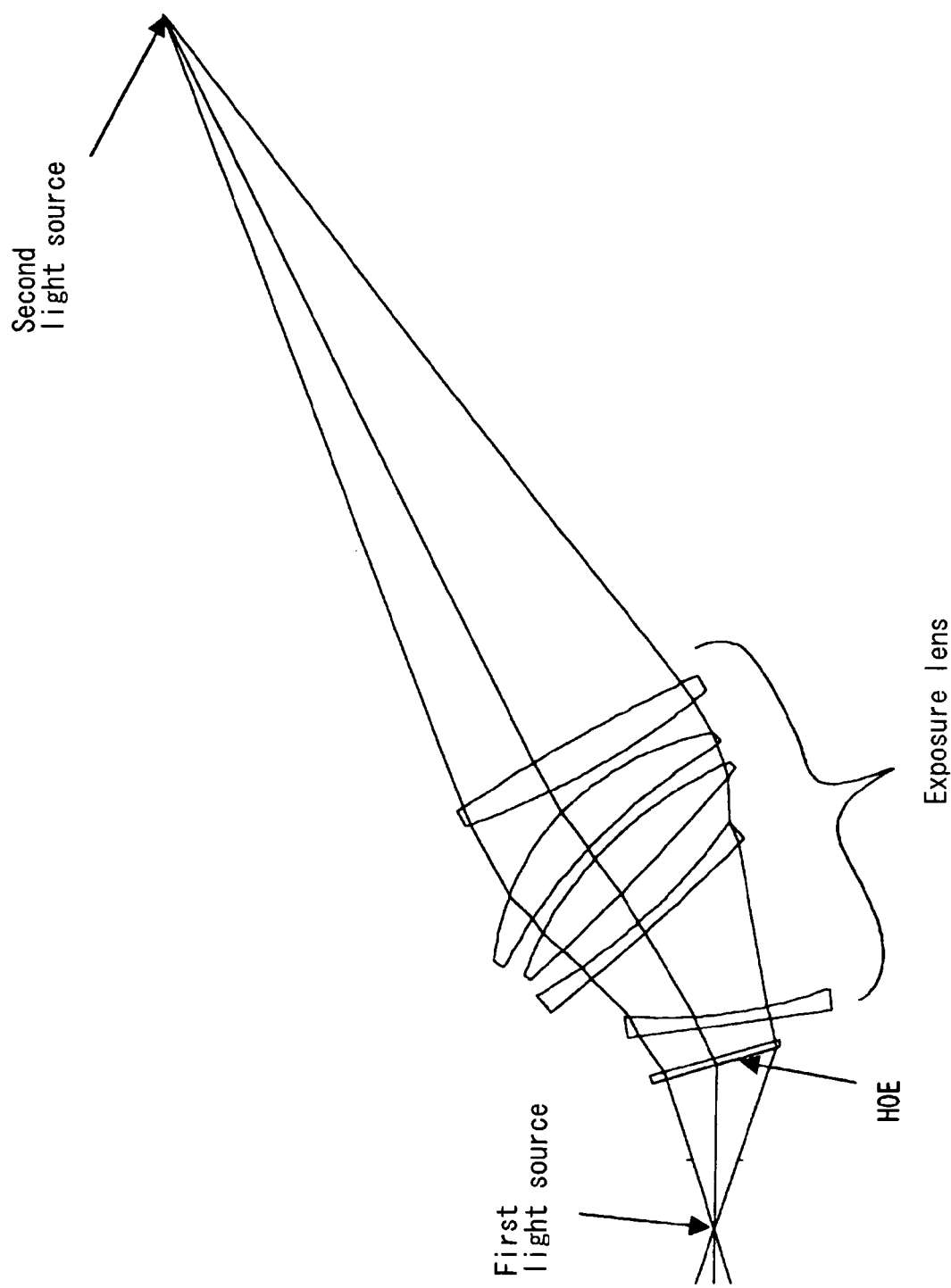
FIG. 21 is a diagram showing the exposure optical system that is used to expose the reflective type holographic optical element of a conventional image display device.

The optical system shown in FIG. 4 basically corresponds to the exposure lens shown in FIG. 21; this optical system is constructed from one prism 21 and one spherical lens 22, and is constructed in an extremely simple manner.

As is shown in FIG. 5, the prism 21 is constructed from a small part 5d that constitutes a portion of the plate-form part 5 in FIG. 1 described above, a holding member 24 which has the same refractive index as the small part 5d, and which holds the small part 5d, and a filling agent (not shown in the figures) which fills the gap between the small part 5d and the holding member 24, and which has the same refractive index as the small part 5d and the holding member 24. A reflective type HOE 6 (strictly speaking, a photosensitive material layer that is used to form a reflective type HOE 6) is formed on the surface of the prism 21 located on the side of the small part 5d, and the prism 21 is arranged so that after exposure is completed and the manufacture of the reflective type HOE 6 is completed, the small part 5d on which the reflective type HOE 6 is formed can be removed from the holding member 24, and the reflective type HOE 6 can be disposed in the interior of the plate-form part 5 by the method described above.

In FIGS. 4 and 5, the exit pupil P is disposed in a position obtained by correcting the position of the exit pupil P shown in FIG. 1 for the refractive index in air, using the position of the HOE 6 as a reference. In FIGS. 4 and 5, B1 indicates the exposure light beam (reference light) created by the first light source (light source on the side of the exit pupil P) during the exposure of the reflective type HOE 6, and B2 indicates the parallel light beam (planar wave) used to form the exposure light beam (object light) created by the second light source. Thus, the optical system shown in FIG. 4 is an afocal optical system. Furthermore, 22a indicates the surface of the spherical lens 22 on the side of the prism 21, and 22b indicates the surface of the spherical lens 22 on the side of the second light source.

In the hologram exposure apparatus shown in FIG. 6, when the shutter 32 that is used to control the exposure time is open, the laser light source 31 is incident on a beam expander/beam shaper unit 33. This unit 33 has a lens 34 that focuses the incident light on a focal point, a pinhole 35 that is disposed at this focal point, and a collimator lens 36 that collimates the light that passes through the pinhole 35; this unit 33 combines a function as a spatial filter that cuts noise light, and a function as a beam expander that expands the beam diameter. After the polarization direction of the parallel light beam from the unit 33 is rotated by a ½ wavelength plate 37, only a specified polarized component passes through a polarizing beam splitter 38. The ½ wavelength plate 37 is arranged so that an appropriate rotation can be effected, and the ½ wavelength plate 37 and polarizing beam splitter 38 constitute a light quantity adjustment part. The light that passes through the polarizing beam splitter 38 is reflected by a mirror 39, and is then split into two light beams by a beam splitter 40.

The light beam that passes through the beam splitter 40 is reflected by a mirror 41, and is constricted to a desired diameter by a diaphragm 42; then, while still in the form of a parallel light beam (planar wave), this light is incident (as an exposure light beam (reference light beam) created by the first light source (light source on the side of the exit pupil P)) on a hologram photosensitive material such as an emulsion used to form a reflective type HOE 6 that is applied to the prism 21 as a coating.

Meanwhile, the light beam that is reflected by the beam splitter 40 is reflected by a mirror 43, and is focused on a focal point by a focusing lens 44; this light passes through a pinhole 45 that is disposed at this focal point, and is then converted into a parallel light beam and expanded to the necessary light beam diameter by a collimator lens 46, and further constricted to a specified diameter by a diaphragm 47, thus forming the parallel light beam B2 that is used to form the exposure light beam (object light beam) created by the second light source. This parallel light beam (planar wave) B2 is converted into the desired non-spherical wave by the lens 22 and prism 21, and is incident (from the opposite side from that of the reference light) on the hologram photosensitive material such as an emulsion used to form a reflective type HOE 6 that is applied to the prism 21 as a coating.

As a result of the reference light beam and object light beam thus being incident on this photosensitive material such as an emulsion, interference fringes of the reference light and object light are recorded on the photosensitive material as (for example) differences in refractive index. Furthermore, it goes without saying that the photosensitive material is developed if necessary following this exposure.

There are various design procedures for exposure lenses; however, Code V (described above) was used in the design of the optical system shown in FIG. 4. In the case of Code V, ray tracing to the second light source is performed passing through the reflective type HOE 6 from the first light source of the reflective type HOE 6 shown in Table 1. If an action equivalent to the phase conversion action in the reflective type HOE 6 is performed by the insertion of the optical system shown in FIG. 4 following passage through the HOE 6, then the wave front can form a clean spherical wave and be focused as an image on the second light source with no aberration.

When the optical system shown in FIG. 4 is set on the basis of the setting values of the optical system of the image display device shown in Tables 1 and 2, the reflective type HOE 6 is altered to transmission settings; in this case, however, the conversion actions of the non-spherical phase terms must be equal. Accordingly, it is necessary that the phase coefficients be equally transferred, and that the coordinates of the first light source be used as the object point, with ray tracing being performed from this point. Even if the exposure system is designed from a distance that is different from that of the first light source defined in the playback system, a correct phase conversion action cannot be obtained. However, in the design of the optical system shown in FIG. 4, the distance of the first light source from the origin of the HOE plane, i.e., $2.2 \times 10^9$ mm, is extremely large; accordingly, the value of the distance (calculated in air) between the first light source and the HOE 6 may be viewed as infinity. Accordingly, this was actually viewed as infinity, and the ray tracing of the optical system shown in FIG. 4 was designed with parallel light being caused to be incident.

Here, the various quantities used for the ray tracing of the optical system shown in FIG. 4 are shown in Table 3 below. The order of the optical planes (order of the plane numbers) is the order from the first light source (=light source on the side of the exit pupil P of the image combiner) to the second light source.

In Table 3, the symbol S1 of the plane number 1 indicates the first light source. The various coefficients of the hologram plane of plane number 3 are the same as in Table 1 described above. The entry pupil diameter must be a diameter that satisfies the effective diameter of the hologram plane; here, this diameter is 6.2. Since this is light from a point light source (here, parallel light as the limit), no angle of view is needed. The wavelength used for ray tracing is the exposure wavelength of 532 nm. This optical system is an afocal optical system in which the light becomes parallel light after leaving the surface of plane number 6.

TABLE 3

| Plane number (symbol) | Curvature radius | Medium nd | νd |
|---|---|---|---|
| 1 (S1) | INFINITY | | |
| 2 (P) | INFINITY | | |
| 3 (6) | INFINITY | 1.596229 | 40.4 |

Hologram plane:
Definition of two light beams

| HV1: | VIR | HV2: | VIR | | |
|---|---|---|---|---|---|
| HX1: | $0.000000 \times 10^{+00}$ | HY1: | $-.173228 \times 10^{+10}$ | HZ1: | $-.135831 \times 10^{+10}$ |
| HX2: | $0.000000 \times 10^{+00}$ | HY2: | $0.300000 \times 10^{+06}$ | HZ2: | $-.213231 \times 10^{+07}$ |

Phase coefficient

| C2: | $6.4341 \times 10^{-01}$ | C3: | $-1.1210 \times 10^{-02}$ | C5: | $-9.0059 \times 10^{-03}$ |
|---|---|---|---|---|---|
| C7: | $-1.3958 \times 10^{-04}$ | C9: | $-7.0582 \times 10^{-05}$ | C10: | $4.8900 \times 10^{-06}$ |
| C12: | $5.9881 \times 10^{-06}$ | C14: | $3.7963 \times 10^{-06}$ | C16: | $-6.3066 \times 10^{-06}$ |
| C18: | $-1.5310 \times 10^{-06}$ | C20: | $-6.8667 \times 10^{-06}$ | C21: | $3.0656 \times 10^{-06}$ |
| C23: | $4.3271 \times 10^{-06}$ | C25: | $5.9772 \times 10^{-08}$ | C27: | $1.4296 \times 10^{-06}$ |
| C29: | $1.7262 \times 10^{-07}$ | C31: | $-1.9135 \times 10^{06}$ | C33: | $-2.4034 \times 10^{-06}$ |
| C35: | $1.0147 \times 10^{-06}$ | C36: | $-4.3191 \times 10^{-07}$ | C38: | $-2.6873 \times 10^{-07}$ |
| C40: | $3.4866 \times 10^{-07}$ | C42: | $1.0228 \times 10^{-06}$ | C44: | $-5.5562 \times 10^{-07}$ |
| C46: | $-1.2622 \times 10^{-09}$ | C48: | $1.5068 \times 10^{-07}$ | C50: | $2.6807 \times 10^{-07}$ |
| C52: | $2.7379 \times 10^{07}$ | C54: | $-6.8986 \times 10^{-08}$ | C55: | $1.8862 \times 10^{-08}$ |
| C57: | $1.0718 \times 10^{-09}$ | C59: | $-2.1626 \times 10^{-08}$ | C61: | $-1.3252 \times 10^{-07}$ |
| C63: | $-9.6312 \times 10^{-08}$ | C65: | $4.7721 \times 10^{08}$ | | |

| Plane number (symbol) | Curvature radius | Medium nd | νd |
|---|---|---|---|
| 4 (21b) | INFINITY | | |
| 5 (22a) | −1158.0113 | 1.516800 | 64.103 |
| 6 (22b) | −92.2168 | | |

Furthermore, the absolute positions of the centers of the respective optical planes with the center of the third plane (plane number 3=symbol 6 in FIG. 4, hologram plane) taken as the origin (X, Y, Z)=(0, 0, 0) and the amounts of rotation of these planes about the X-axis (values measured with the counterclockwise direction taken as the positive direction) are shown in Table 4 below as the positional relationships of the respective optical planes of the optical system shown in FIG. 4.

TABLE 4

| Plane No. (symbol) | X coordinate value | Y coordinate value | Z coordinate value | Rotational angle about X axis [degree] |
|---|---|---|---|---|
| 2 (P) | 0.00000 | −10.23007 | −8.02157 | 51.8994 |
| 3 (6) | 0.00000 | 0.00000 | 0.00000 | 0.0000 |

TABLE 4-continued

| Plane No. (symbol) | X coordinate value | Y coordinate value | Z coordinate value | Rotational angle about X axis [degree] |
|---|---|---|---|---|
| 4 (21b) | 0.00000 | −3.25869 | 6.00000 | −54.8135 |
| 5 (22a) | 0.00000 | −32.07451 | 135.37508 | 6.7639 |
| 6 (22b) | 0.00000 | −31.36784 | 141.33332 | 6.7639 |

Figure 7:
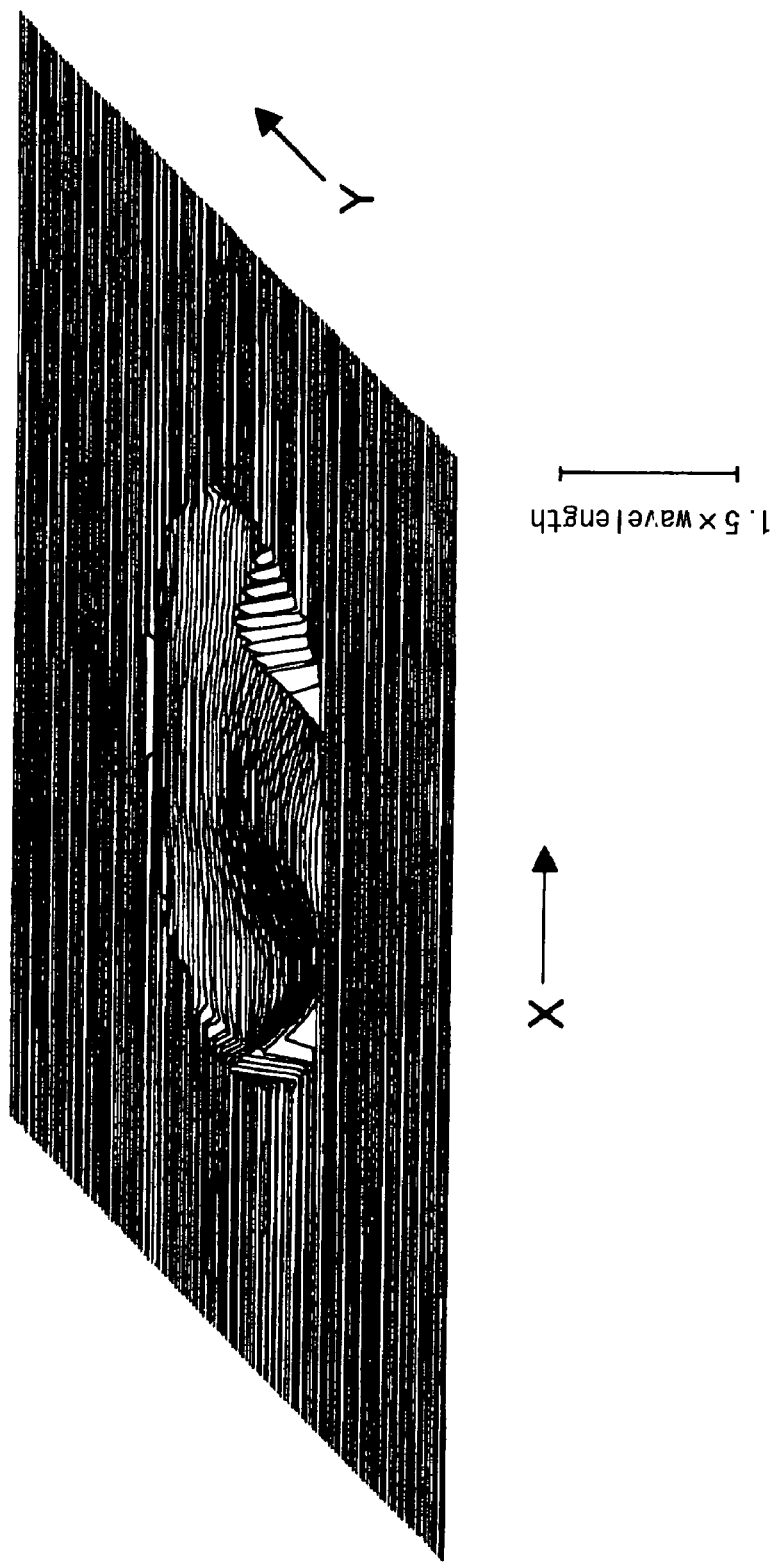
FIG. 7 is a residual wave front aberration diagram of the optical system shown in FIG. 4.

FIG. 7 shows a wave front aberration diagram on the exit pupil plane (i.e., surface 23 in FIG. 4) according to the ray tracing of the optical system shown in FIG. 4. As is seen from FIG. 7, the correction is extremely good, i.e., 0.1 λ in terms of RMS.

Next, the performance of the reflective type HOE 6 exposed by the hologram exposure apparatus shown in FIG. 6 including the optical system shown in FIG. 4 described above is ascertained. In order to do this, it is necessary to compare the optical performance of the optical system of the image display device constituting the first concrete example in a case where a reflective type HOE 6 exposed by the hologram exposure apparatus shown in FIG. 6 including the optical system shown in FIG. 4 is incorporated into the optical system of this image display device instead of the design reflective type HOE 6 having the design values defined in Table 1, with the optical performance of the optical system of this image display device in a case where it is assumed that the reflective type HOE 6 with the design values defined in Table 1 is incorporated "as is."

Figure 8:
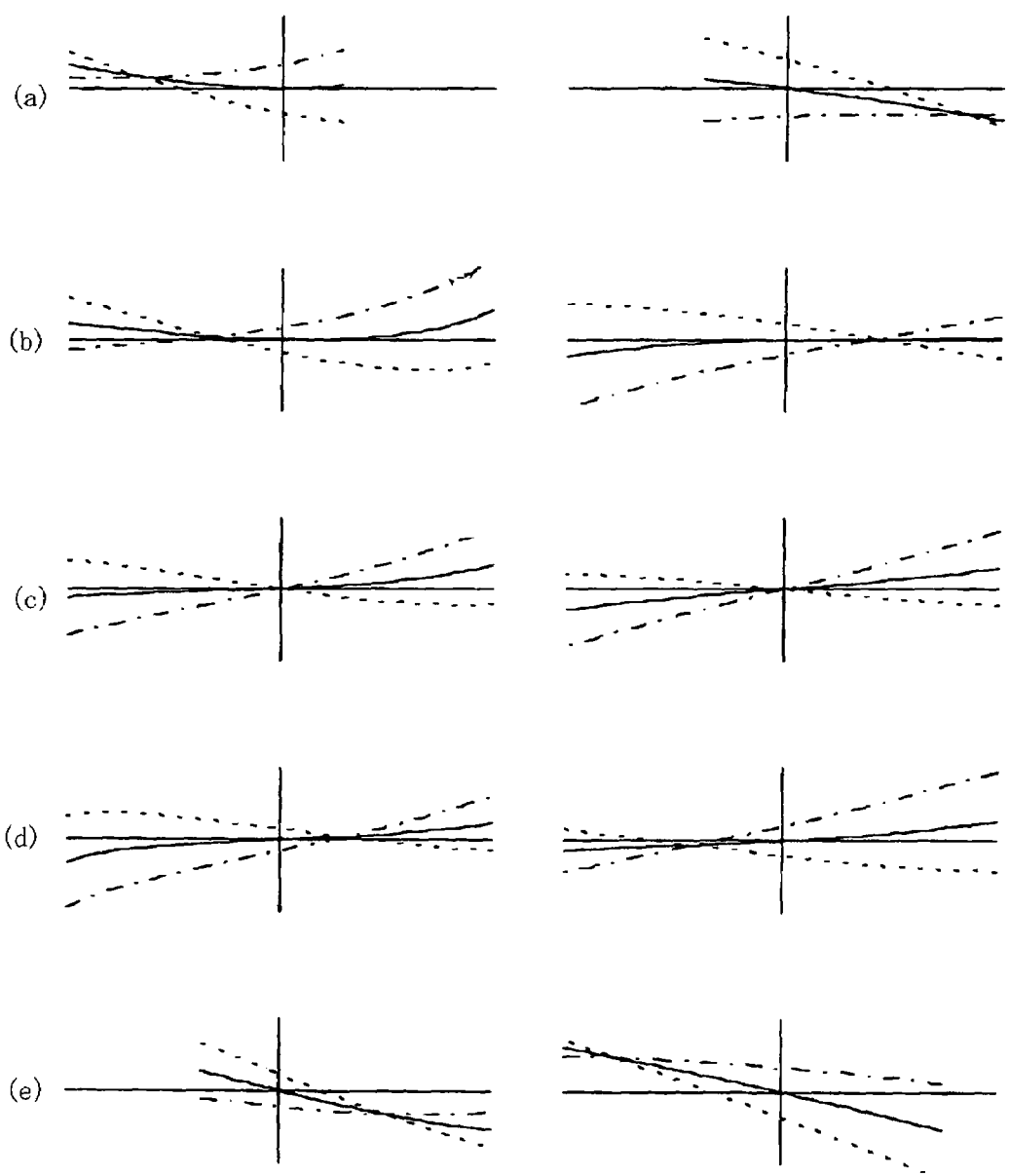
FIG. 8 is a lateral aberration diagram of the image display device constituting a first concrete example of the first working configuration of the present invention, incorporating a reflective type holographic optical element exposed using the optical system shown in FIG. 4. (a) indicates a case in which the angle of view (X, Y)=(−6.66°, 5.00°), (b) indicates a case in which the angle of view (X, Y)=(−3.33°, 2.50°), (c) indicates a case in which the angle of view (X, Y)=(0.00°, 0.00°), (d) indicates a case in which the angle of view (X, Y)=(3.33°, −2.50°), and (e) indicates a case in which the angle of view (X, Y)=(6.66°, −5.00°). The figures on the left side indicate lateral aberration in the Y direction, and the figures on the right side indicate lateral aberration in the X direction. Furthermore, the solid lines indicate light with a wavelength of 521.36 nm, the broken lines indicate light with a wavelength of 531.36 nm, and the one-dot chain lines indicate light with a wavelength of 511.36 nm. With regard to the vertical axis, as in FIG. 3, the upper end of the axis is 0.0250, and the lower end is −0.250.
Figure 9:
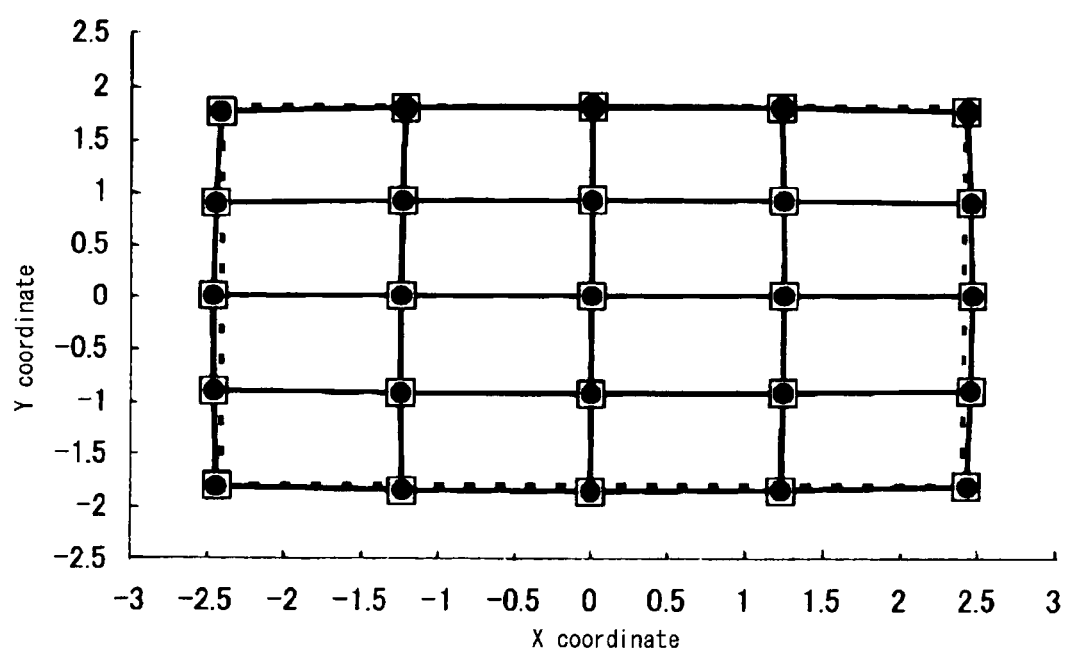
FIG. 9 is a diagram which shows a comparison between the distortion in the case of the original design values and the distortion in the case of the incorporation of a reflective type holographic optical element exposed using the optical system shown in FIG. 4, for the image display device constituting a first concrete example of the first working configuration of the present invention. The broken line indicates the size of the picture elements, the line connecting black circles indicates the design values of the end-use system, and the line connecting white squares indicates the values of the playback system using an HOE following exposure.

This can be accomplished by performing optimization with the phase function of the HOE 6 as a variable so that the residual aberration of the optical system shown in FIG. 4 is completely 0 λ in terms of RMS, and evaluating the performance with this coefficient applied to the lens data of the optical system of the image display device shown in Table 1. FIG. 8 shows a lateral aberration diagram of the optical system of the image display device incorporating an HOE 6 following exposure simulated by this method; the distortion of this optical system (distortion at the surface of the display part of the image display element 2) is shown in FIG. 9.

The lateral aberration shown in FIG. 8 shows good results that are more or less the same as the lateral aberration shown in FIG. 3. Furthermore, both distortions are more or less comparable. Thus, the performance of the reflective type HOE 6 exposed using the optical system shown in FIG. 4 is comparable to the performance of the design reflective type HOE 6 defined in Table 1, and is therefore favorable.

[Second Concrete Example of First Working Configuration]

Next, a second concrete example of the first working configuration will be described.

This second concrete example differs from the first concrete example described above only in that the various quantities (design values) that define the reflective type HOE 6 among the various optical quantities shown in Table described above are replaced with the quantities shown in Table 5 below. In the case of Table 1, the distance (distance calculated in air) Rd from the HOE 6 to the first light source (light source on the side of the eyes of the observer during playback) is more or less infinity, i.e., $2.2 \times 10^9$ mm; on the other hand, in the case of Table 5, the distance Rd is set at 19.98 mm. However, the other respective quantities relating to the hologram planes defined in Table 5 are set so that an image focusing performance is obtained which is more or less comparable to that of the reflective type HOE 6 having the various quantities relating to the hologram planes defined in Table 1.

Furthermore, in this second concrete example as well, the distance Pd (calculated in terms of air) from the HOE 6 to the pupil plane of the exit pupil P is the same 14.06 mm as in the first concrete example described above. Accordingly, in this second concrete example, Rd=1.42×Pd.

description is omitted. Furthermore, in this concrete example, the position of the first light source is the position shown at $O_1$.

Figure 10:
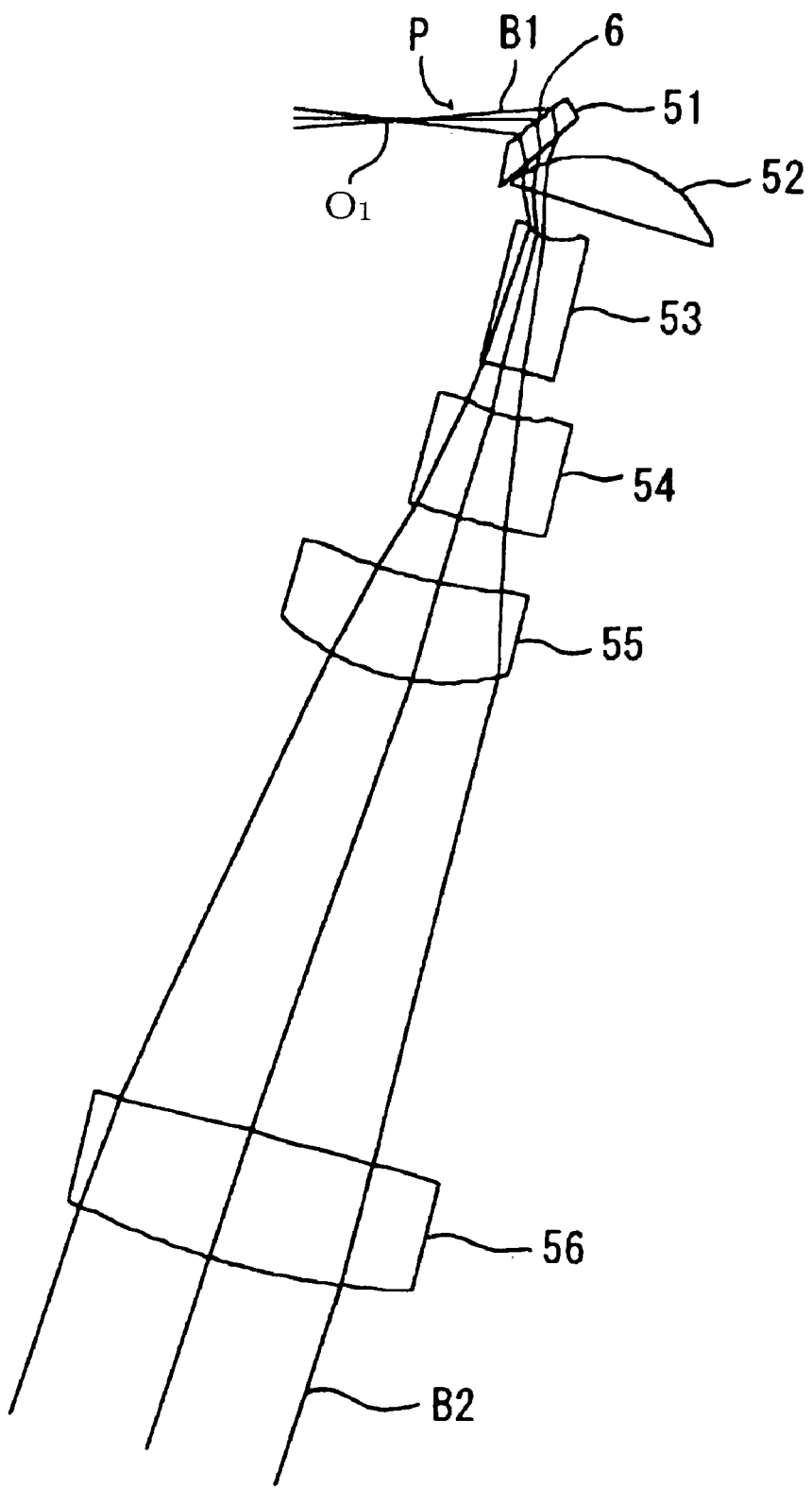
FIG. 10 is an optical path diagram showing the essential parts of the exposure optical system that is used to expose the reflective type holographic optical element in an image display device constituting a second concrete example of the first working configuration of the present invention.

The optical system shown in FIG. 10 has a construction in which a single prism 51 coated with a photosensitive material such as an emulsion that forms a reflective type HOE 6, a single cylindrical lens 52 and four spherical lenses 53 through 56 are eccentrically disposed. Furthermore, although this is not shown in the figure, the prism 51 is constructed from a small part 5*d* that constitutes one portion of the plate-form part 5 shown in FIG. 1, a holding member that holds this small part 5*d*, and a filling material that fills the space between these parts, like the prism 21 shown in FIGS. 4 and 5.

In the case of the optical system shown in FIG. 10, only a shift is used for the respective lens eccentricities of the lens group; tilting is not used. Accordingly, compared to the conventional exposure optical system shown in FIG. 21, the required tolerances of the metal parts that support the lenses and the required precision of assembly are easily obtained. However, in the case of the optical system shown in FIG. 10, more or less as in the case of the conventional exposure optical system shown in FIG. 21, the number of constituent lenses is large; accordingly, the tolerances are strict.

An apparatus in which the optical system shown in FIG. 10 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 10. However, in the second concrete example, since the distance Rd is set at 19.98 mm, a convex lens is coaxially disposed, for example, between the mirror 41 and diaphragm 42 in accordance with this distance. Furthermore, it goes without saying that the

TABLE 5

| Plane number (symbol) | | Curvature radius | | Medium nd | | vd | |
|---|---|---|---|---|---|---|---|
| 3 (6) | | INFINITY | | 1.596229 | | 40.4 Reflective plane | |
| Hologram plane: | | | | | | | |
| Definition of two light beams | | | | | | | |
| HV1: | REA | HV2: | VIR | | | | |
| HX1: | $0.000000 \times 10^{+00}$ | HY1: | $-.157255 \times 10^{+02}$ | HZ1: | $-.123306 \times 10^{+02}$ | | |
| HX2: | $0.000000 \times 10^{+00}$ | HY2: | $0.300000 \times 10^{+06}$ | HZ2: | $-.213231 \times 10^{+07}$ | | |
| Phase coefficient | | | | | | | |
| C2: | $6.4111 \times 10^{-01}$ | C3: | $-1.4147 \times 10^{-02}$ | C5: | $6.7622 \times 10^{-04}$ | | |
| C7: | $-1.0315 \times 10^{-03}$ | C9: | $-4.2591 \times 10^{-04}$ | C10: | $6.5841 \times 10^{-07}$ | | |
| C12: | $3.0459 \times 10^{-05}$ | C14: | $1.5036 \times 10^{-06}$ | C16: | $-5.0732 \times 10^{-06}$ | | |
| C18: | $-2.0023 \times 10^{-06}$ | C20: | $-3.8089 \times 10^{-06}$ | C21: | $2.2637 \times 10^{07}$ | | |
| C23: | $-1.7895 \times 10^{-07}$ | C25: | $1.5559 \times 10^{-06}$ | C27: | $4.4580 \times 10^{-06}$ | | |
| C29: | $6.2301 \times 10^{-07}$ | C31: | $6.7059 \times 10^{-07}$ | C33: | $-2.9845 \times 10^{-06}$ | | |
| C35: | $4.1786 \times 10^{-07}$ | C36: | $-6.1226 \times 10^{-08}$ | C38: | $1.5685 \times 10^{-07}$ | | |
| C40: | $-1.0540 \times 10^{-07}$ | C42: | $3.2292 \times 10^{-07}$ | C44: | $-5.9409 \times 10^{-07}$ | | |
| C46: | $-2.1441 \times 10^{-08}$ | C48: | $-2.4405 \times 10^{-08}$ | C50: | $-9.0636 \times 10^{-08}$ | | |
| C52: | $6.0644 \times 10^{-07}$ | C54: | $-2.7338 \times 10^{-08}$ | C55: | $3.1255 \times 10^{-09}$ | | |
| C57: | $-1.3599 \times 10^{-08}$ | C59: | $1.2567 \times 10^{-08}$ | C61: | $1.3417 \times 10^{-08}$ | | |
| C63: | $-1.4143 \times 10^{07}$ | C65: | $2.9702 \times 10^{08}$ | | | | |

The exposure optical system used in the actual manufacture of the reflective type HOE 6 defined in Table 5 was designed by the same method as that used to design the exposure optical system used in the actual manufacture of the reflective type HOE 6 defined in Table 1. An optical path diagram of the essential parts of this exposure optical system is shown in FIG. 10. In FIG. 10, elements that are the same as elements in FIG. 4 or that correspond to elements in FIG. 4 are labeled with the same symbols, and a redundant positions and angles of the parts of the elements 43 through 47 in FIG. 6 are altered in order to satisfy the angular relationship between light beams B1 and B2 in FIG. 10.

[Third Concrete Example of First Working Configuration]

Next, a third concrete example of the first working configuration will be described.

This third concrete example differs from the first concrete example described above in that the exposure wavelength is set at 476 nm, and in that the various quantities (design values) that define the reflective type HOE 6 among the various optical quantities shown in Table 1 described above are replaced with the quantities shown in Table 6 below. In the case of Table 1, the distance (distance calculated in air) Rd from the HOE 6 to the first light source (light source on the side of the eyes of the observer during playback) was more or less infinity, i.e. $2.2 \times 10^9$ mm, while in the case of Table 6, the distance Rd is set at 37.43 mm. However, the other quantities relating to the hologram planes defined in Table 6 are set so that an image focusing performance is obtained which is more or less comparable to that of the reflective type HOE 6 having the various quantities relating to the hologram planes defined in Table 1.

Furthermore, in this third concrete example as well, the distance (calculated in air) Pd from the HOE 6 to the pupil plane of the exit pupil P is 14.06 mm as in the first concrete example described above. Accordingly, in this third concrete example, Rd=2.66×Pd.

number of lenses can be reduced by one cylindrical lens. Furthermore, in the case of the optical system shown in FIG. 11 as well, only a shift is used for the respective lens eccentricities of the lens group; tilting is not used.

Figure 11:
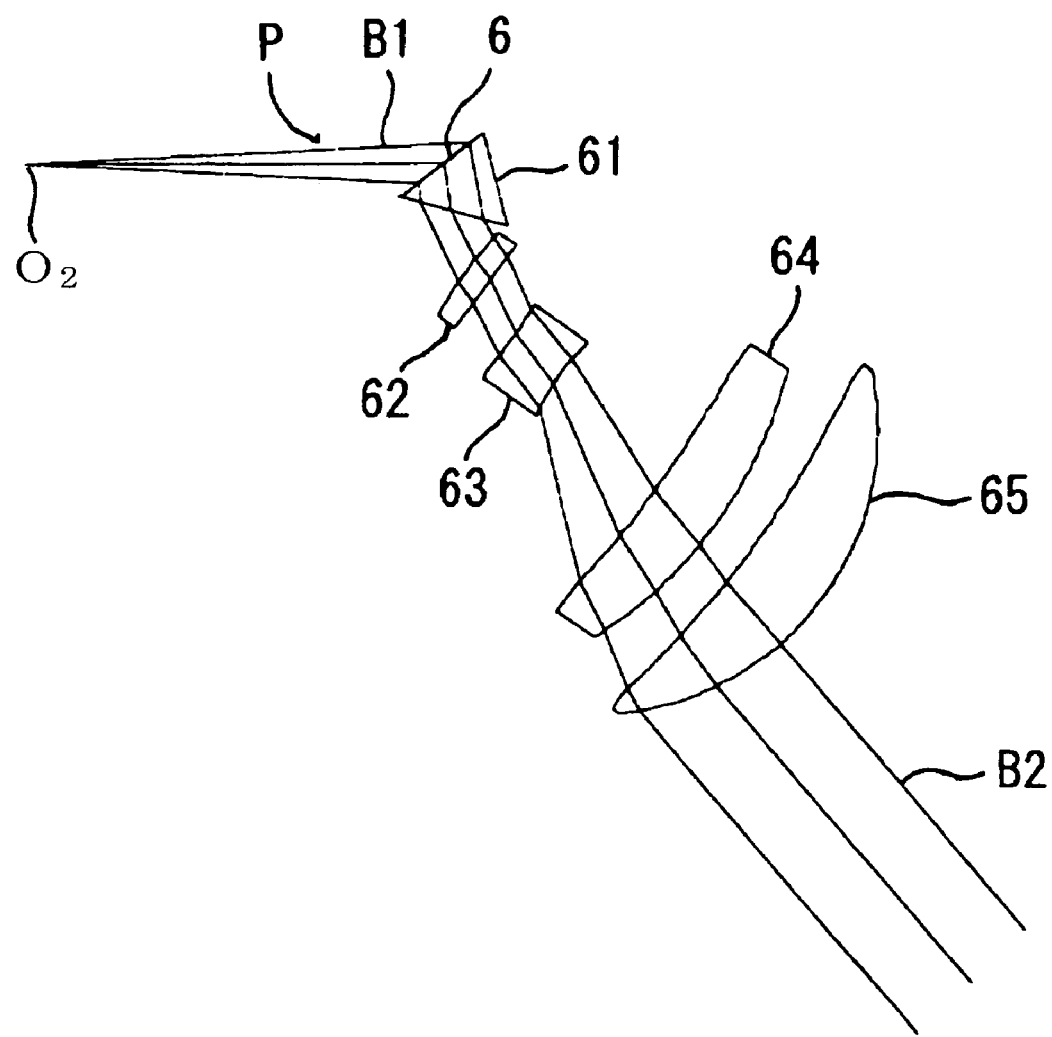
FIG. 11 is an optical path diagram showing the essential parts of the exposure optical system that is used to expose the reflective type holographic optical element in an image display device constituting a third concrete example of the first working configuration of the present invention.

An apparatus in which the optical system shown in FIG. 11 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 11. However, in the third concrete example, since the distance Rd is set at 37.43 mm, a convex lens is coaxially disposed, for example, between the mirror 41 and diaphragm 42 in accordance with this distance. Furthermore, it goes without saying that the positions and angles of the parts of the elements 43 through 47 in FIG. 6 are altered in order to satisfy the angular relationship between light beams B1 and B2 in FIG. 11.

TABLE 6

| Plane number (symbol) | Curvature radius | Medium nd | vd | |
|---|---|---|---|---|
| 3 (6) | INFINITY | 1.596229 | 40.4 | Reflective plane |

Hologram plane:
Definition of two light beams
HV1: REA    HV2: VIR
HX1: $0.000000 \times 10^{+00}$    HY1: $-.293706 \times 10^{+02}$    HZ1: $-.231950 \times 10^{+02}$
HX2: $0.000000 \times 10^{+00}$    HY2: $0.300000 \times 10^{+06}$    HZ2: $-.213231 \times 10^{+07}$ Phase coefficient
C2:  $6.4562 \times 10^{-01}$   C3:  $2.1484 \times 10^{-03}$   C5:  $-3.8810 \times 10^{-03}$
C7:  $-4.2961 \times 10^{-04}$   C9:  $-2.0878 \times 10^{-04}$   C10: $-1.5455 \times 10^{05}$
C12: $1.2828 \times 10^{-05}$   C14: $8.6036 \times 10^{-06}$   C16: $-2.0197 \times 10^{-05}$
C18: $-1.6424 \times 10^{-05}$   C20: $3.1442 \times 10^{-07}$   C21: $1.2270 \times 10^{-05}$
C23: $1.0753 \times 10^{-05}$   C25: $1.0455 \times 10^{-05}$   C27: $-8.4147 \times 10^{-07}$
C29: $2.9980 \times 10^{-06}$   C31: $3.1664 \times 10^{-07}$   C33: $-1.8134 \times 10^{-06}$
C35: $2.5856 \times 10^{-08}$   C36: $-2.0185 \times 10^{-06}$   C38: $-1.7766 \times 10^{-06}$
C40: $-1.1308 \times 10^{-06}$   C42: $-1.3573 \times 10^{-06}$   C44: $5.1589 \times 10^{-08}$
C46: $-2.2024 \times 10^{-07}$   C48: $3.4876 \times 10^{-08}$   C50: $3.5466 \times 10^{-07}$
C52: $7.2321 \times 10^{-07}$   C54: $-1.5338 \times 10^{-08}$   C55: $1.1275 \times 10^{-07}$
C57: $1.2705 \times 10^{-07}$   C59: $2.2362 \times 10^{-08}$   C61: $-5.0651 \times 10^{-08}$
C63: $-9.4909 \times 10^{-08}$   C65: $1.8711 \times 10^{-09}$ The exposure optical system used in the actual manufacture of the reflective type HOE 6 defined in Table 6 was designed by the same method as that used to design the exposure optical system used in the actual manufacture of the reflective type HOE 6 defined in Table 1. An optical path diagram of the essential parts of this exposure optical system is shown in FIG. 11. In FIG. 11, elements that are the same as elements in FIG. 4 or that correspond to elements in FIG. 4 are labeled with the same symbols, and a redundant description is omitted. Furthermore, in this concrete example, the position of the first light source is the position shown at $O_2$.

The optical system shown in FIG. 11 has a construction in which a single prism 61 coated with a photosensitive material such as an emulsion that forms a reflective type HOE 6, and four spherical lenses 62 through 65, are eccentrically disposed. Furthermore, although this is not shown in the figure, the prism 61 is constructed from a small part 5d that constitutes one portion of the plate-form part 5 shown in FIG. 1, a holding member that holds this small part 5d, and a filling material that fills the space between these parts, like the prism 21 shown in FIGS. 4 and 5.

In the case of the optical system shown in FIG. 11, compared to the optical system shown in FIG. 10, the

[Fourth Concrete Example of First Working Configuration]

Next, a fourth concrete example of the first working configuration will be described.

This fourth concrete example differs from the first concrete example described above in that the exposure wavelength is set at 647 nm, and in that the various quantities (design values) that define the reflective type HOE 6 among the various optical quantities shown in Table 1 described above are replaced with the quantities shown in Table 7 below. In the case of Table 1, the distance (distance calculated in air) Rd from the HOE 6 to the first light source (light source on the side of the eyes of the observer during playback) was more or less infinity, i.e., $2.2 \times 10^9$ mm, while in the case of Table 7, the distance Rd is set at 75.23 mm. However, the other quantities relating to the hologram planes defined in Table 7 are set so that an image focusing performance is obtained which is more or less comparable to that of the reflective type HOE 6 having the various quantities relating to the hologram planes defined in Table 1.

Furthermore, in this fourth concrete example as well, the distance (calculated in air) Pd from the HOE 6 to the pupil plane of the exit pupil P is 14.06 mm as in the first concrete example described above. Accordingly, in this fourth concrete example, Rd=5.35×Pd.

TABLE 7

| Plane number (symbol) | | Curvature radius | Medium nd | | vd | |
|---|---|---|---|---|---|---|
| 3 (6) | | INFINITY | 1.596229 | | 40.4 | Reflective plane |
| Hologram plane: | | | | | | |
| Definition of two light beams | | | | | | |
| HV1: | REA | HV2: | VIR | | | |
| HX1: | $0.000000 \times 10^{+00}$ | HY1: | $-.553760 \times 10^{+02}$ | HZ1: | $-.509267 \times 10^{+02}$ | |
| HX2: | $0.000000 \times 10^{+00}$ | HY2: | $0.300000 \times 10^{+06}$ | HZ2: | $-.213239 \times 10^{+07}$ | |
| Phase coefficient | | | | | | |
| C2: | $5.8653 \times 10^{-01}$ | C3: | $-4.7580 \times 10^{03}$ | C5: | $-6.0876 \times 10^{-03}$ | |
| C7: | $-2.4040 \times 10^{-04}$ | C9: | $-9.9769 \times 10^{-05}$ | C10: | $1.1280 \times 10^{-06}$ | |
| C12: | $-9.9745 \times 10^{-06}$ | C14: | $-4.8552 \times 10^{-06}$ | C16: | $-6.9748 \times 10^{-06}$ | |
| C18: | $-1.8263 \times 10^{-06}$ | C20: | $-5.6603 \times 10^{-06}$ | C21: | $4.3977 \times 10^{-06}$ | |
| C23: | $4.5293 \times 10^{-06}$ | C25: | $1.3025 \times 10^{06}$ | C27: | $5.1045 \times 10^{-06}$ | |
| C29: | $6.0870 \times 10^{-07}$ | C31: | $-8.1812 \times 10^{-07}$ | C33: | $-8.4377 \times 10^{-07}$ | |
| C35: | $8.1137 \times 10^{-07}$ | C36: | $-6.5192 \times 10^{-07}$ | C38: | $2.8374 \times 10^{07}$ | |
| C40: | $-9.8121 \times 10^{-07}$ | C42: | $1.9651 \times 10^{-06}$ | C44: | $-1.4067 \times 10^{-06}$ | |
| C46: | $-7.7498 \times 10^{-08}$ | C48: | $2.0578 \times 10^{-07}$ | C50: | $-9.3853 \times 10^{-08}$ | |
| C52: | $9.2070 \times 10^{-08}$ | C54: | $-4.9617 \times 10^{-08}$ | C55: | $3.0027 \times 10^{-08}$ | |
| C57: | $-5.9862 \times 10^{-08}$ | C59: | $9.6063 \times 10^{-08}$ | C61: | $-1.8475 \times 10^{-07}$ | |
| C63: | $-1.7459 \times 10^{-07}$ | C65: | $1.1549 \times 10^{-07}$ | | | |

Figure 12:
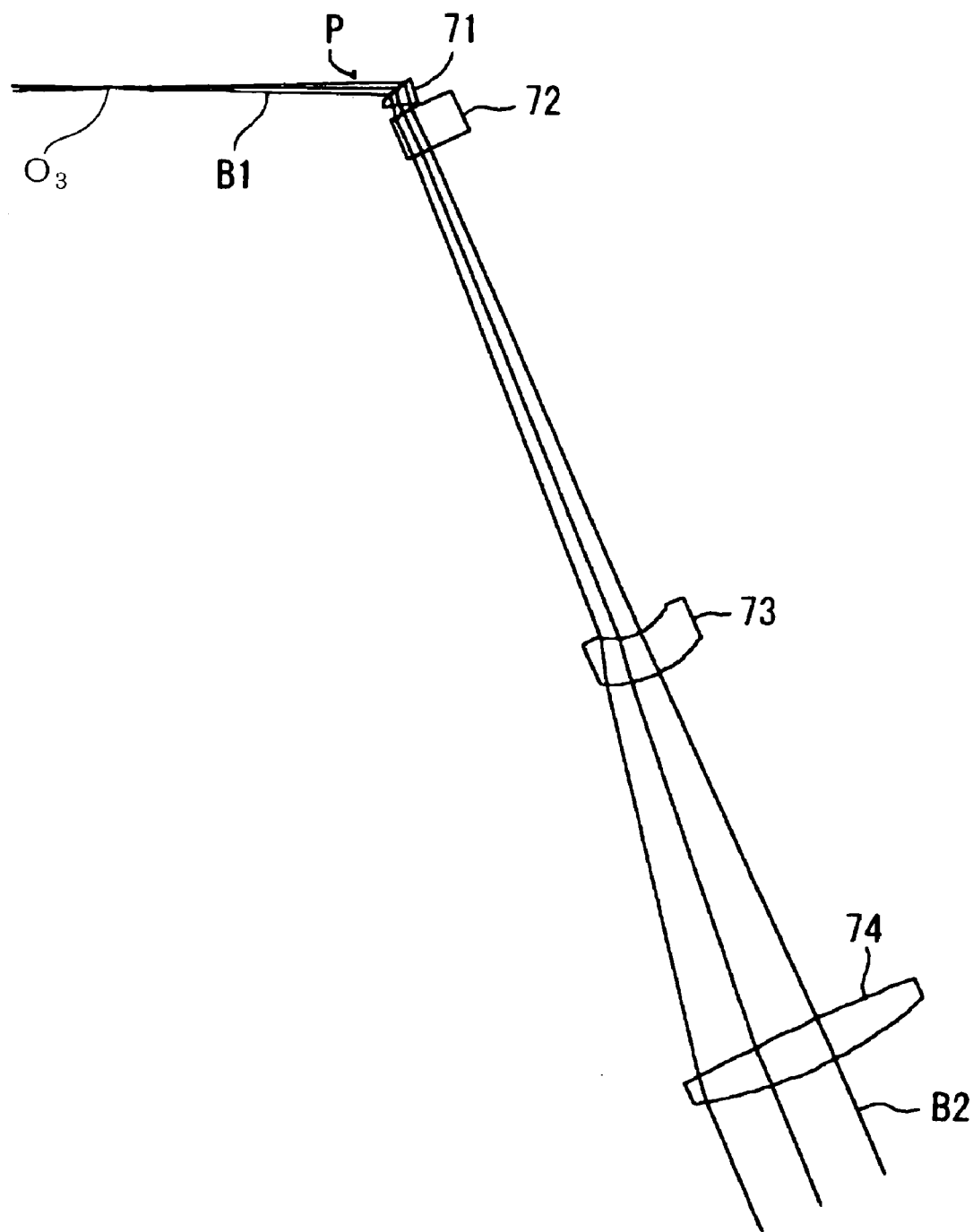
FIG. 12 is an optical path diagram showing the essential parts of the exposure optical system that is used to expose the reflective type holographic optical element in an image display device constituting a fourth concrete example of the first working configuration of the present invention.

The exposure optical system used in the actual manufacture of the reflective type HOE 6 defined in Table 7 was designed by the same method as that used to design the exposure optical system used in the actual manufacture of the reflective type HOE 6 defined in Table 1. An optical path diagram of the essential parts of this exposure optical system is shown in FIG. 12. In FIG. 12, elements that are the same as elements in FIG. 4 or that correspond to elements in FIG. 4 are labeled with the same symbols, and a redundant description is omitted. Furthermore, in this concrete example, the position of the first light source is the position shown at O₃.

The optical system shown in FIG. 12 has a construction in which a single prism 71 coated with a photosensitive material such as an emulsion that forms a reflective type HOE 6, and three spherical lenses 72 through 74, are eccentrically disposed. Furthermore, although this is not shown in the figure, the prism 71 is constructed from a small part 5d that constitutes one portion of the plate-form part 5 shown in FIG. 1, a holding member that holds this small part 5d, and a filling material that fills the space between these parts, like the prism 21 shown in FIGS. 4 and 5.

In the case of the optical system shown in FIG. 12, compared to the optical system shown in FIG. 11, the number of lenses can be reduced by one spherical lens. Furthermore, in the case of the optical system shown in FIG. 12 as well, only a shift is used for the respective lens eccentricities of the lens group; tilting is not used.

An apparatus in which the optical system shown in FIG. 12 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 12. However, in the fourth concrete example, since the distance Rd is set at 75.23 mm, a convex lens is coaxially disposed, for example, between the mirror 41 and diaphragm 42 in accordance with this distance. Furthermore, it goes without saying that the positions and angles of the parts of the elements 43 through 47 in FIG. 6 are altered in order to satisfy the angular relationship between light beams B1 and B2 in FIG. 12.

[Fifth Concrete Example of First Working Configuration]

Next, a fifth concrete example of the first working configuration will be described.

This fifth concrete example differs from the first concrete example described above in that the exposure wavelength is set at 476 nm, and in that the various quantities (design values) that define the reflective type HOE 6 among the various optical quantities shown in Table 1 described above are replaced with the quantities shown in Table 8 below. In the case of Table 1, the distance (distance calculated in air) Rd from the HOE 6 to the first light source (light source on the side of the eyes of the observer during playback) was more or less infinity, i.e., 2.2×10⁹ mm, while in the case of Table 8, the distance Rd is set at 146.28 mm. However, the other quantities relating to the hologram planes defined in Table 8 are set so that an image focusing performance is obtained which is more or less comparable to that of the reflective type HOE 6 having the various quantities relating to the hologram planes defined in Table 1.

Furthermore, in this fifth concrete example as well, the distance (calculated in air) Pd from the HOE 6 to the pupil plane of the exit pupil P is 14.06 mm as in the first concrete example described above. Accordingly, in this fifth concrete example, Rd=10.40×Pd.

TABLE 8

| Plane number (symbol) | | Curvature radius | Medium nd | | vd | |
|---|---|---|---|---|---|---|
| 3 (6) | | INFINITY | 1.596229 | | 40.4 | Reflective plane |
| Hologram plane: | | | | | | |
| Definition of two light beams | | | | | | |
| HV1: | REA | HV2: | VIR | | | |
| HX1: | $0.000000 \times 10^{+00}$ | HY1: | $-.114800 \times 10^{+03}$ | HZ1: | $-.906616 \times 10^{+02}$ | |
| HX2: | $0.000000 \times 10^{+00}$ | HY2: | $0.300000 \times 10^{+06}$ | HZ2: | $-.213231 \times 10^{+07}$ | |
| Phase coefficient | | | | | | |

TABLE 8-continued

| Plane number (symbol) | | Curvature radius | | Medium nd | | vd | |
|---|---|---|---|---|---|---|---|
| C2: | $6.4562 \times 10^{-01}$ | C3: | $-7.7935 \times 10^{-03}$ | C5: | $-7.6999 \times 10^{-03}$ | | |
| C7: | $-1.6780 \times 10^{-04}$ | C9: | $-1.0821 \times 10^{-04}$ | C10: | $-1.3111 \times 10^{05}$ | | |
| C12: | $8.8526 \times 10^{-06}$ | C14: | $6.7304 \times 10^{-06}$ | C16: | $-2.0346 \times 10^{-05}$ | | |
| C18: | $-1.6415 \times 10^{-05}$ | C20: | $3.3963 \times 10^{-07}$ | C21: | $1.2269 \times 10^{-05}$ | | |
| C23: | $1.0758 \times 10^{-05}$ | C25: | $1.0457 \times 10^{-05}$ | C27: | $-8.4145 \times 10^{-07}$ | | |
| C29: | $2.9982 \times 10^{-06}$ | C31: | $3.1652 \times 10^{-07}$ | C33: | $-1.8137 \times 10^{-06}$ | | |
| C35: | $2.5814 \times 10^{-08}$ | C36: | $-2.0185 \times 10^{-06}$ | C38: | $-1.7766 \times 10^{-06}$ | | |
| C40: | $-1.1308 \times 10^{-06}$ | C42: | $-1.3573 \times 10^{-06}$ | C44: | $5.1578 \times 10^{-08}$ | | |
| C46: | $-2.2024 \times 10^{07}$ | C48: | $3.4870 \times 10^{08}$ | C50: | $3.5469 \times 10^{-07}$ | | |
| C52: | $7.2325 \times 10^{-07}$ | C54: | $-1.5335 \times 10^{-08}$ | C55: | $1.1275 \times 10^{-07}$ | | |
| C57: | $1.2705 \times 10^{-07}$ | C59: | $2.2363 \times 10^{08}$ | C61: | $-5.0658 \times 10^{-08}$ | | |
| C63: | $-9.4917 \times 10^{-08}$ | C65: | $1.8712 \times 10^{-09}$ | | | | |

Figure 13:
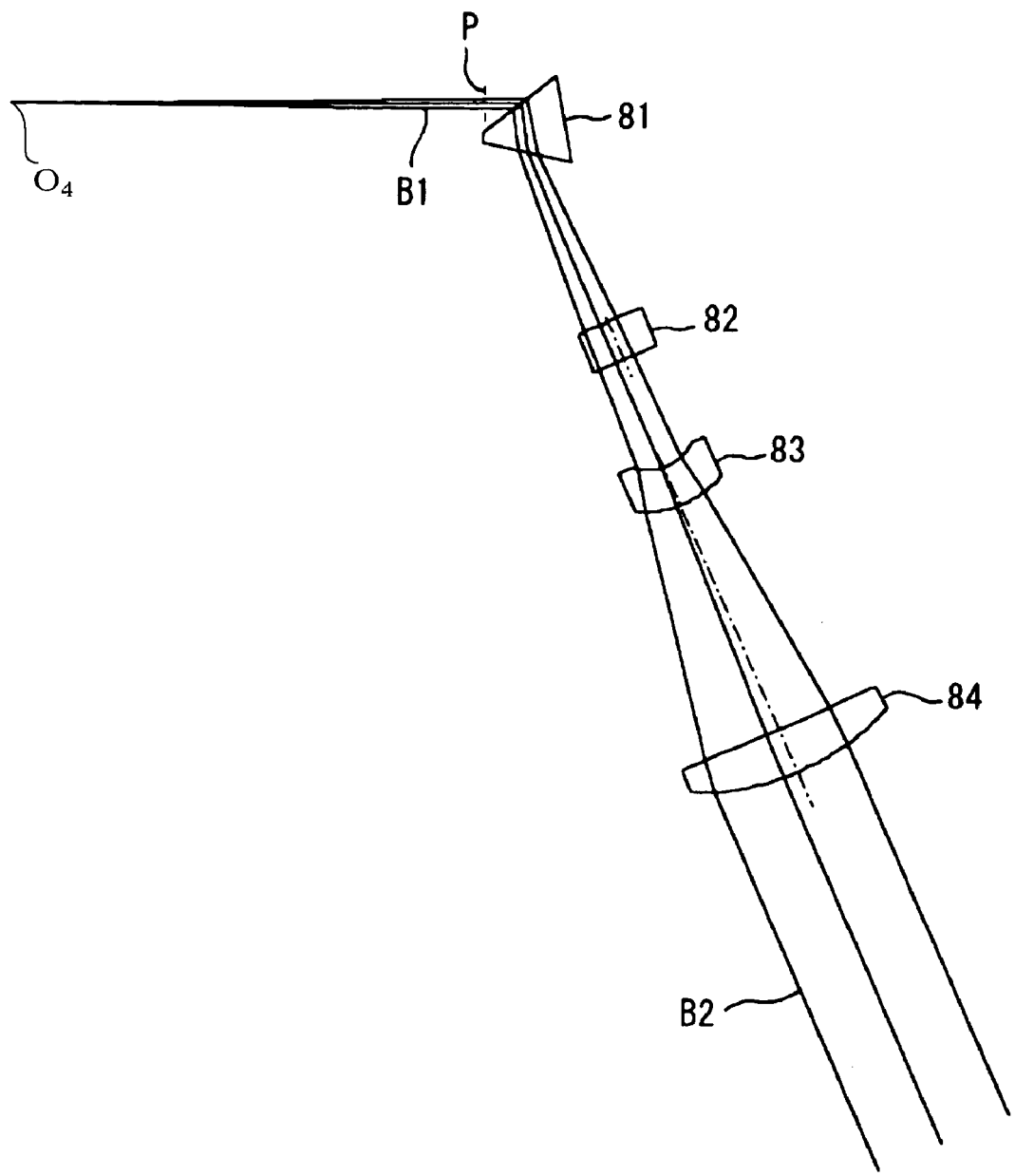
FIG. 13 is an optical path diagram showing the essential parts of the exposure optical system that is used to expose the reflective type holographic optical element in an image display device constituting a fifth concrete example of the first working configuration of the present invention.

The exposure optical system used in the actual manufacture of the reflective type HOE 6 defined in Table 8 was designed by the same method as that used to design the exposure optical system used in the actual manufacture of the reflective type HOE 6 defined in Table 1. An optical path diagram of the essential parts of this exposure optical system is shown in FIG. 13. In FIG. 13, elements that are the same as elements in FIG. 4 or that correspond to elements in FIG. 4 are labeled with the same symbols, and a redundant description is omitted. Furthermore, in this concrete example, the position of the first light source is the position shown at $O_4$.

The optical system shown in FIG. 13 has a construction in which a single prism 81 coated with a photosensitive material such as an emulsion that forms a reflective type HOE 6, a single cylindrical lens 82 which has a curvature in the plane of the page in FIG. 13, but which is planar in the cross section perpendicular to the plane of the page, and two spherical lenses 83 and 84, are eccentrically disposed. However, since the spherical lens 83 and spherical lens 84 are coaxial, the total number of axes of eccentricity of the lenses is two. Furthermore, only a shift is used for the respective lens eccentricities of the lens group; tilting is not used.

Furthermore, although this is not shown in the figure, the prism 81 is constructed from a small part 5d that constitutes one portion of the plate-form part 5 shown in FIG. 1, a holding member that holds this small part 5d, and a filling material that fills the space between these parts, like the prism 21 shown in FIGS. 4 and 5.

An apparatus in which the optical system shown in FIG. 13 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 13. However, in the fifth concrete example, since the distance Rd is set at 146.28 mm, a convex lens is coaxially disposed, for example, between the mirror 41 and diaphragm 42 in accordance with this distance. Furthermore, it goes without saying that the positions and angles of the parts of the elements 43 through 47 in FIG. 6 are altered in order to satisfy the angular relationship between light beams B1 and B2 in FIG. 13.

[Sixth Concrete Example of First Working Configuration]

Next, a sixth concrete example of the first working configuration will be described.

This sixth concrete example differs from the first concrete example described above only in that the various quantities (design values) that define the reflective type HOE 6 among the various optical quantities shown in Table 1 described above are replaced with the quantities shown in Table 9 below. In the case of Table 1, the distance (distance calculated in air) Rd from the HOE 6 to the first light source (light source on the side of the eyes of the observer during playback) was more or less infinity, i.e., $2.2 \times 10^9$ mm, while in the case of Table 9, the distance Rd is slightly shorter at $2 \times 10^7$ mm, but is still set more or less at infinity. However, the other quantities relating to the hologram planes defined in Table 9 are set so that an image focusing performance is obtained which is more or less comparable to that of the reflective type HOE 6 having the various quantities relating to the hologram planes defined in Table 1.

Furthermore, in this sixth concrete example as well, the distance (calculated in air) Pd from the HOE 6 to the pupil plane of the exit pupil P is 14.06 mm as in the first concrete example described above.

TABLE 9

| Plane number (symbol) | | Curvature radius | | Medium nd | | vd | |
|---|---|---|---|---|---|---|---|
| 3 (6) | | INFINITY | | 1.596229 | | 40.4 Reflective plane | |
| Hologram plane: | | | | | | | |
| Definition of two light beams | | | | | | | |
| HV1: | REA | HV2: | VIR | | | | |
| HX1: | $0.000000 \times 10^{+00}$ | HY1: | $-.154564 \times 10^{+10}$ | HZ1: | $-.156741 \times 10^{+10}$ | | |
| HX2: | $0.000000 \times 10^{+00}$ | HY2: | $0.161469 \times 10^{+05}$ | HZ2: | $-.213757 \times 10^{+07}$ | | |
| Phase coefficient | | | | | | | |
| C2: | $6.9691 \times 10^{-01}$ | C3: | $-6.8879 \times 10^{-03}$ | C5: | $-4.9727 \times 10^{-03}$ | | |
| C7: | $4.5573 \times 10^{06}$ | C9: | $-5.8581 \times 10^{05}$ | C10: | $8.2522 \times 10^{05}$ | | |
| C12: | $1.0705 \times 10^{-06}$ | C14: | $-2.7546 \times 10^{-05}$ | C16: | $1.3809 \times 10^{-06}$ | | |
| C18: | $8.7299 \times 10^{-06}$ | C20: | $1.9922 \times 10^{-05}$ | C21: | $-6.1812 \times 10^{-06}$ | | |
| C23: | $2.7606 \times 10^{-05}$ | C25: | $2.1018 \times 10^{-05}$ | C27: | $3.0300 \times 10^{-05}$ | | |
| C29: | $-1.9307 \times 10^{-06}$ | C31: | $-7.7454 \times 10^{-07}$ | C33: | $-3.1438 \times 10^{-06}$ | | |

TABLE 9-continued

| Plane number (symbol) | | Curvature radius | | Medium nd | vd |
|---|---|---|---|---|---|
| C35: | $-5.5880 \times 10^{-06}$ | C36: | $3.3921 \times 10^{-07}$ | C38: | $-3.0563 \times 10^{-06}$ |
| C40: | $-3.9916 \times 10^{-06}$ | C42: | $-1.3029 \times 10^{-06}$ | C44: | $-6.5609 \times 10^{-06}$ |
| C46: | $1.1493 \times 10^{07}$ | C48: | $6.4394 \times 10^{08}$ | C50: | $1.3610 \times 10^{-07}$ |
| C52: | $3.0892 \times 10^{-07}$ | C54: | $4.2329 \times 10^{-07}$ | C55: | $-8.0825 \times 10^{-09}$ |
| C57: | $1.2810 \times 10^{-07}$ | C59: | $2.1026 \times 10^{-07}$ | C61: | $2.8983 \times 10^{-08}$ |
| C63: | $2.5455 \times 10^{-08}$ | C65: | $4.2578 \times 10^{-07}$ | | |

Figure 14:
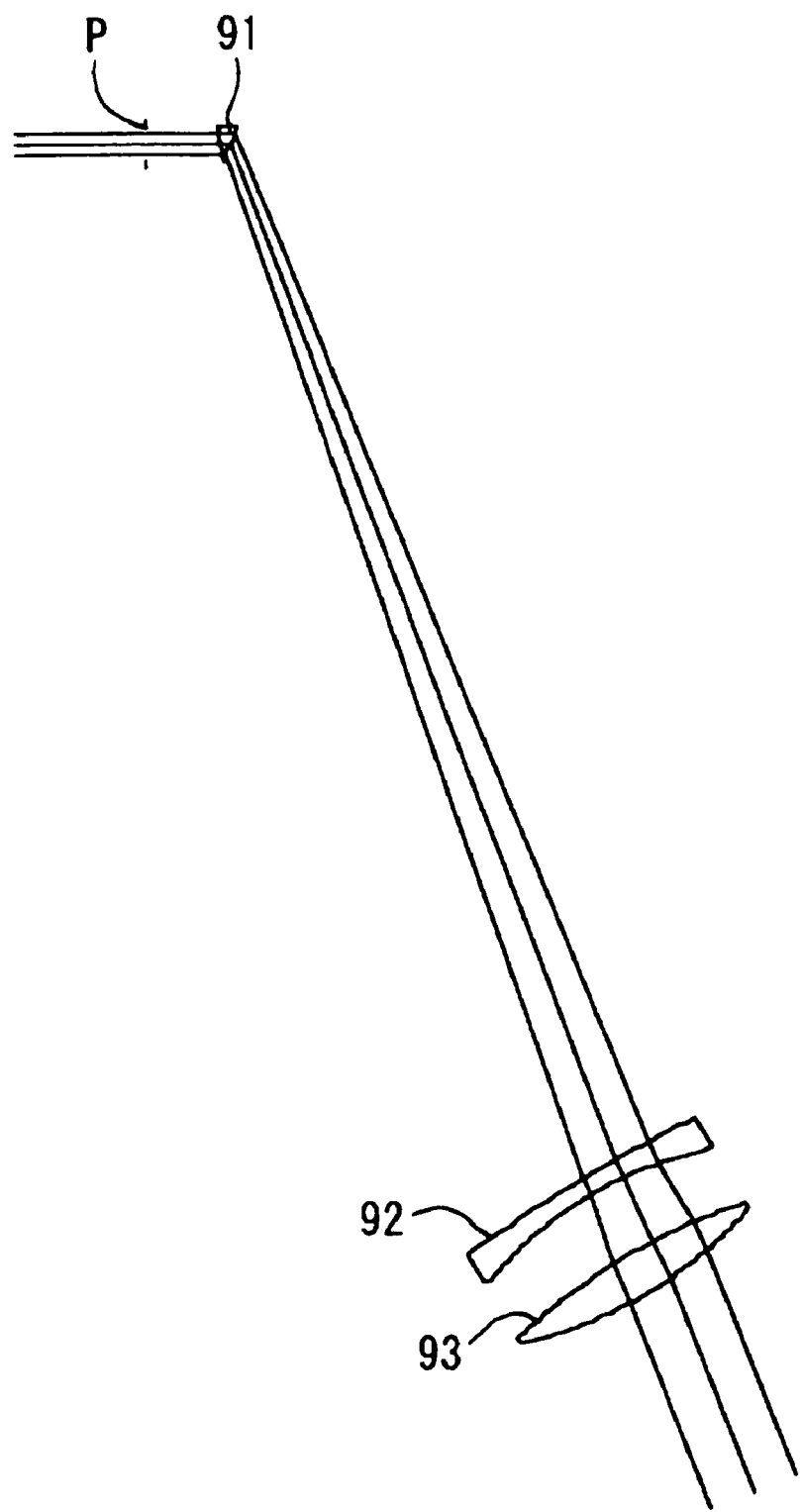
FIG. 14 is an optical path diagram showing the essential parts of the exposure optical system that is used to expose the reflective type holographic optical element in an image display device constituting a sixth concrete example of the first working configuration of the present invention.

The exposure optical system used in the actual manufacture of the reflective type HOE 6 defined in Table 9 was designed by the same method as that used to design the exposure optical system used in the actual manufacture of the reflective type HOE 6 defined in Table 1. An optical path diagram of the essential parts of this exposure optical system is shown in FIG. 14. In FIG. 14, elements that are the same as elements in FIG. 4 or that correspond to elements in FIG. 4 are labeled with the same symbols, and a redundant description is omitted. Furthermore, in this sixth concrete example, the value of the distance Rd may be viewed as infinity, and the ray tracing of the exposure lens was actually designed with parallel light being caused to be incident as in the case of the first concrete example described above.

The optical system shown in FIG. 14 has a single prism 91 coated with a photosensitive material such as an emulsion that forms a reflective type HOE 6, and two mutually coaxial spherical lenses 92 and 93. If the lens group is coaxial, the lens group can be retained by the fittings that constitute supporting parts so that decentering is eliminated while viewing the transmitted light when the lens group is incorporated into the fittings; accordingly, the performance is greatly improved. Furthermore, if right angles are obtained between the attachment plane of the fittings and the center axis of the external diameter of the lens, angular and positional precision can easily be obtained even if the subsequent disposition is decentered.

Furthermore, although this is not shown in the figure, the prism 91 is a prism comparable to the small part 5d that constitutes a part of the plate-form part 5 in FIG. 1.

An apparatus in which the optical system shown in FIG. 14 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 14. Furthermore, it goes without saying that the positions and angles of the parts of the elements 43 through 47 in FIG. 6 are altered in order to satisfy the angular relationship between light beams B1 and B2 in FIG. 14.

[Investigation Based on First through Sixth Concrete Examples of First Working Configuration]

When the first through sixth concrete examples of the first working configuration described above are compared, it is seen that in cases where an HOE 6 endowed with higher-order (third order or higher) non-spherical surface phase terms is exposed, the exposure optical system becomes simpler as the distance (distance calculated in air) Rd from the HOE 6 to the first light source (light source on the side of the eyes of the observer during playback) becomes greater.

The reason for this may be viewed as follows:

Below, ray tracing is performed from the side of the pupil of the eye of the observer in all cases. Furthermore, the playback system refers to an image combiner optical system in which the exposed reflective type HOE is incorporated in the plate-form part and integrated with the image display device. Moreover, the ray tracing of the playback system is performed toward the display screen of the image display device from the virtual image observed by the observer.

The exposure system refers to an optical system that is used to expose the reflective type HOE defined in the playback system; ray tracing is performed with the first light source of the reflective type HOE as the object point so that an image is focused on the second light source via the exposure lens after the light passes through the HOE.

Here, when the optical system of the exposure system is designed based on the playback system, the reflective type HOE 6 is altered to a transmission setting; in this case, the conversion action of the non-spherical surface phase terms must be equal. Accordingly, it is necessary that the phase coefficients be equally transferred, and that the coordinates of the first light source be used as the object point, with ray tracing being performed from this point. Even if the exposure system is designed from a distance that is different from the first light source defined in the playback system, a correct phase conversion action cannot be obtained.

Incidentally, the reason that the construction of the exposure optical system becomes simpler as the distance Rd becomes greater depends on the divergence angle of the light rays after being incident on the HOE 6 from the first light source (in the exposure system) and being transmitted through the HOE 6. If an attempt is made to construct an equivalent to the respective conversion actions where light rays with a non-spherical wave front are bundled, the required phase conversion action must be imparted to the respective light rays at a point where the light rays are densely concentrated in spatial terms. Accordingly, it is necessary to use numerous lenses, and to perform the desired correction while causing refraction of light a small amount at a time.

On the other hand, with regard to the amount of non-spherical curvature, where the light beam diverges even in the case of a comparable non-spherical wave front, the respective components are spatially separated; accordingly, correction is easy.

Furthermore, the angle of divergence of the light rays following transmission through the HOE in the exposure system depends on the light source distance of the first light source.

For example, when the distance Rd is substantially equal to the distance of the synthetic focal point of the end-use system, if ray tracing is performed from the coordinates of the light source in the optical layout of the end-use system as a reflective type HOE, the light beam that is reflected by the HOE is a light beam that is emitted from the vicinity of the focal point; accordingly, this light beam is substantially parallel. The exposure lens is designed so that a light bundle extended this substantially parallel light toward the opposite side of the HOE is converted into light bundle without aberration.

Next, in cases where the distance Rd is shorter than the distance of the synthetic focal point of the end-use system, if ray tracing is performed from the coordinates of the first light source in the optical layout of the end-use system, the light bundle becomes divergent light after being reflected by the HOE plane. Since the exposure lens converts the light beam extending this divergent light toward the opposite side of the HOE into light bundle without aberration, a correction must be added to the convergent light so that an image is focused without aberration.

In cases where the light source is sufficiently distant, convergent light is produced following reflection when ray tracing is performed from the coordinates of the light source in the end-use system. Furthermore, since the light beam extending this convergent light bundle toward the opposite side of the HOE is converted into light bundle without aberration, it is sufficient if the divergent light is corrected, so that the exposure lens construction can be simplified.

The degree of divergence increases with the distance of the first light source, and correction is facilitated with greater spatial separation.

In cases where the first light source is close to the plane of the hologram, the incident NA of the exposure system increases; accordingly, the degree of difficulty in the design of the exposure lens increases. If the distance of the light source is increased, since there is no change in the effective diameter of the hologram plane, the incident NA of the exposure system decreases in relative terms, and the construction of the exposure lens can be simplified.

The above has been a consideration of the reasons that the exposure optical system becomes simpler as the distance Rd increases.

Thus, since the exposure optical system becomes simpler as the distance Rd increases, if the distance Rd is made substantially greater than the distance Pd, the exposure optical system used in the manufacture of the reflective type HOE 6 is simplified compared to the conventional image display device in which the distance Rd and distance Pd are caused to coincide.

Furthermore, it is seen from a comparison of the first through sixth concrete examples of the first working configuration described above that it is desirable to set the distance Rd at twice the distance Pd or greater in order to simplify the exposure optical system even further. Moreover, in order to simplify the exposure optical system to an even greater degree, it is desirable to set the distance Rd at five times the distance Pd or greater.

[Second Working Configuration]

Figure 15:
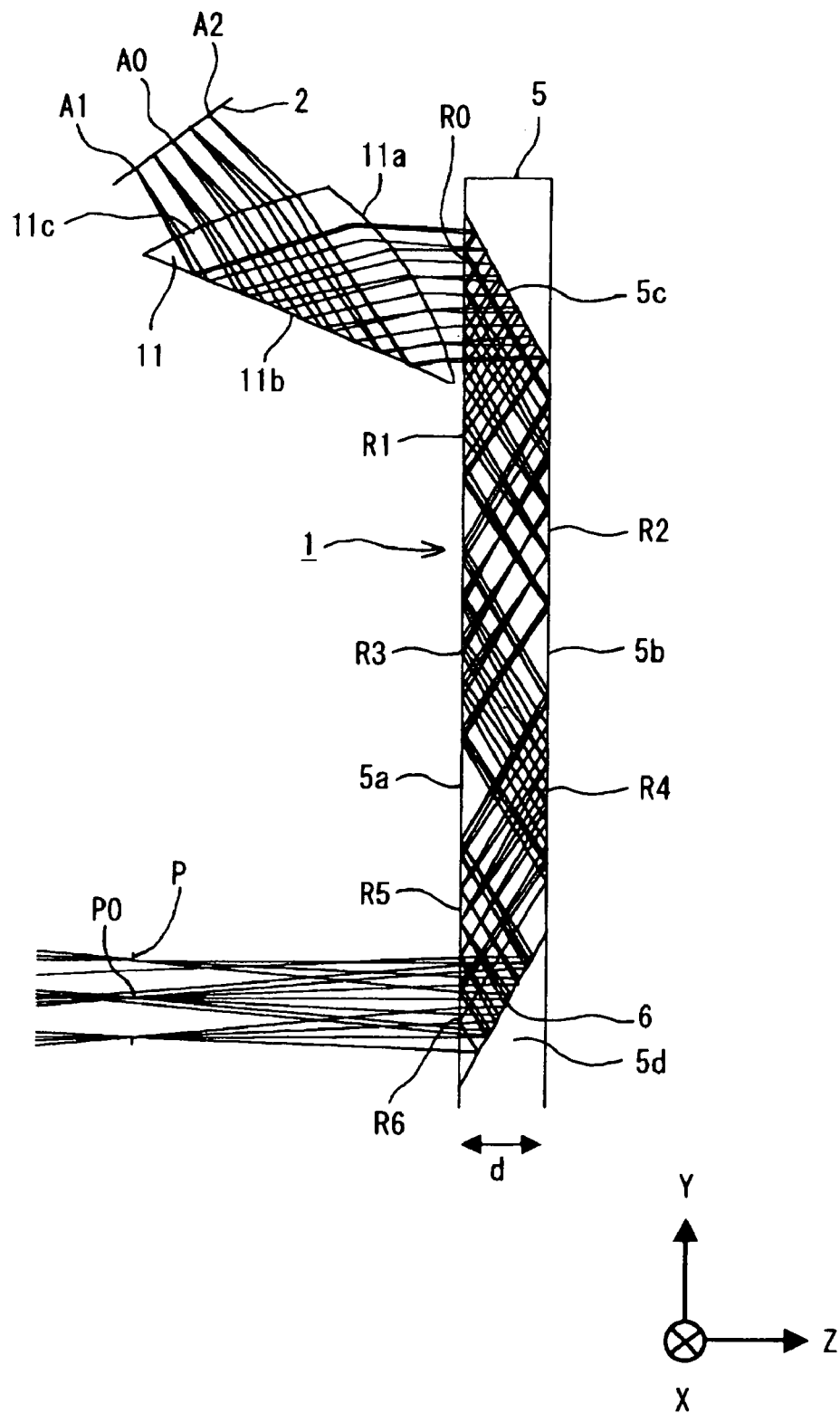
FIG. 15 is a diagram which shows the construction of an image display device constituting a second working configuration of the present invention, and the schematic path of the light rays in this image display device.

FIG. 15 is a diagram which shows the construction of an image display device constituting a second working configuration of the present invention, and the path of the light rays (only the light rays from the image display element 2) in this image display device. In FIG. 15, elements that are the same as in FIG. 1 or that correspond to elements in FIG. 1 are labeled with the same symbols, and a redundant description is omitted. Furthermore, in FIG. 15, the LED 3 and reflective mirror 4 constituting the light source are omitted.

Basically, this working configuration differs from the first concrete example of the first working configuration described above in that the exposure wavelength of the reflective type HOE 6 is 476 nm, and in that the distance Rd between the first light source and the reflective type HOE 6 is 146 mm.

The various optical quantities of the present working configuration are as shown below.

The diameter of the exit pupil P is 3 mm. The visual field angle in the upward direction in the plane of the page in the figure is 5°. The visual field angle in the downward direction in the plane of the page in the figure is −5°. The visual field angle in the direction of depth with respect to the plane of the page is ±6.75°. The screen size in the plane of the page in the figure (length between point A1 and point A2) is 3.6 mm. The screen size in the direction of depth with respect to the plane of the page is 4.8 mm. The thickness d of the plate-form part 5 is 3.4 mm. The plate-form part 5 uses the same material as that used in the first concrete example of the first working configuration described above.

Furthermore, the various quantities used for ray tracing in this working configuration are shown in Table 10 below. The order of the optical planes (order of the plane numbers) is the order from the plane of the pupil of the eye of the user plane of the exit pupil P of the image combiner 1) to the image display element 2.

TABLE 10

| Plane number (symbol) | Curvature radius | Medium nd | vd | |
|---|---|---|---|---|
| 1 (P) | INFINITY | | | |
| 2 (5a: R6) | INFINITY | 1.596229 | 40.4 | |
| 3 (6) | INFINITY | 1.596229 | 40.4 | Reflective plane |

Hologram plane:
Definition of two light beams

| HV1: | REA | HV2: | VIR | | |
|---|---|---|---|---|---|
| HX1: | $0.000000 \times 10^{+00}$ | HY1: | $-.114800 \times 10^{+03}$ | HZ1: | $-.906616 \times 10^{+02}$ |
| HX2: | $0.000000 \times 10^{+00}$ | HY2: | $0.300000 \times 10^{+06}$ | HZ2: | $-.213231 \times 10^{+07}$ |

Phase coefficient

| C2: | $6.4562 \times 10^{-01}$ | C3: | $-7.7935 \times 10^{-03}$ | C5: | $-7.6999 \times 10^{03}$ |
|---|---|---|---|---|---|
| C7: | $-1.6780 \times 10^{-04}$ | C9: | $-1.0821 \times 10^{-04}$ | C10: | $-1.3111 \times 10^{05}$ |
| C12: | $8.8526 \times 10^{-06}$ | C14: | $6.7304 \times 10^{-06}$ | C16: | $-2.0346 \times 10^{-05}$ |
| C18: | $-1.6415 \times 10^{-05}$ | C20: | $3.3963 \times 10^{-07}$ | C21: | $1.2269 \times 10^{-05}$ |
| C23: | $1.0758 \times 10^{-05}$ | C25: | $1.0457 \times 10^{-05}$ | C27: | $-8.4145 \times 10^{-07}$ |
| C29: | $2.9982 \times 10^{-06}$ | C31: | $3.1652 \times 10^{-07}$ | C33: | $-1.8137 \times 10^{-06}$ |
| C35: | $2.5814 \times 10^{-08}$ | C36: | $-2.0185 \times 10^{-06}$ | C38: | $-1.7766 \times 10^{-06}$ |
| C40: | $-1.1308 \times 10^{-06}$ | C42: | $-1.3573 \times 10^{-06}$ | C44: | $5.1578 \times 10^{-08}$ |
| C46: | $-2.2024 \times 10^{07}$ | C48: | $3.4870 \times 10^{-08}$ | C50: | $3.5469 \times 10^{-07}$ |
| C52: | $7.2325 \times 10^{-07}$ | C54: | $-1.5335 \times 10^{8}$ | C55: | $1.1275 \times 10^{-07}$ |
| C57: | $1.2705 \times 10^{-07}$ | C59: | $2.2363 \times 10^{-08}$ | C61: | $-5.0658 \times 10^{-08}$ |
| C63: | $-9.4917 \times 10^{-08}$ | C65: | $1.8712 \times 10^{-09}$ | | |

TABLE 10-continued

| Plane number (symbol) | Curvature radius | Medium nd | vd | |
|---|---|---|---|---|
| 4 (5a: R5) | INFINITY | 1.596229 | 40.4 | Reflective plane |
| 5 (5b: R4) | INFINITY | 1.596229 | 40.4 | Reflective plane |
| 6 (5a: R3) | INFINITY | 1.596229 | 40.4 | Reflective plane |
| 7 (5b: R2) | INFINITY | 1.596229 | 40.4 | Reflective plane |
| 8 (5a: R1) | INFINITY | 1.596229 | 40.4 | Reflective plane |
| 9 (5c) | INFINITY | 1.596229 | 40.4 | Reflective plane |
| 10 (5b: R0) | INFINITY | | | |
| 11 (11a) | −13.83546 | 1.596229 | 40.4 | |
| 12 (11b) | −330.62026 | 1.596229 | 40.4 | Reflective plane |
| 13 (11c) | −26.37009 | 1.596229 | 40.4 | |
| 14 (2) | INFINITY | | | |

Furthermore, with regard to the positional relationship of the respective optical planes in the present working configuration, the absolute positions of the centers of the respective optical planes with the center of the first plane (plane number 1=symbol P in FIG. 1) taken as the origin (X, Y, Z)=(0, 0, 0), and the amounts of rotation of these planes about the X-axis (values measured with the counterclockwise direction taken as the positive direction), are shown in Table 11 below.

TABLE 11

| Plane No. (symbol) | X coordinate value | Y coordinate value | Z coordinate value | Rotational angle about X axis [degree] |
|---|---|---|---|---|
| 1 (P) | 0.00000 | 0.00000 | 0.00000 | 0.0000 |
| 2 (5a: R6) | 0.00000 | 0.00000 | 13.00000 | 0.0000 |
| 3 (6) | 0.00000 | −0.37516 | 14.70000 | −29.3000 |
| 4 (5a: R5) | 0.00000 | 4.00000 | 13.00000 | 0.0000 |
| 5 (5b: R4) | 0.00000 | 8.00000 | 16.40000 | 0.0000 |
| 6 (5a: R3) | 0.00000 | 14.00000 | 13.00000 | 0.0000 |
| 7 (5b: R2) | 0.00000 | 20.00000 | 16.40000 | 0.0000 |
| 8 (5a: R1) | 0.00000 | 25.00000 | 13.00000 | 0.0000 |
| 9 (5c) | 0.00000 | 28.00000 | 14.80000 | 29.0000 |
| 10 (5a: R0) | 0.00000 | 30.00000 | 13.00000 | 0.0000 |
| 11 (11a) | 0.00000 | 27.00000 | 11.80000 | 25.0486 |
| 12 (11b) | 0.00000 | 26.90665 | 6.87646 | 67.0486 |
| 13 (11c) | 0.00000 | 31.282 | 4.22843 | 108.8167 |
| 14 (2) | 0.00000 | 34.0048 | 1.41794 | 126.4527 |

With regard to the first light source (light source located on the side of the eyes of the observer during playback) of the reflective type HOE 6 in this working configuration, the distance from the origin of the HOE plane was 146 mm in the third quadrant of the yz coordinates in FIG. 2 (from HX1:0, HY1:−0.114800×10$^{+03}$, HZ1:−0.906616×10$^{+02}$).

Furthermore, the two light sources of the HOE 6 are defined in air; accordingly, in a case where the HOE 6 during playback is disposed in a medium, the distances are calculated with a correction made for the refractive index, and are compared. In the present working configuration, the distance (distance calculated in air) Rd from the HOE 6 to the first light source is 146 mm. On the other hand, the distance of the plane of the HOE 6 from the pupil plane of the exit pupil P is 14.7 mm. However, 1.7 mm of this distance is located in a medium with a refractive index of approximately 1.6; accordingly, the length converted for air is 1.06 mm, so that the distance (calculated in air) Pd from the HOE 6 to the pupil plane of the exit pupil P is 14.06 mm.

Figure 16:
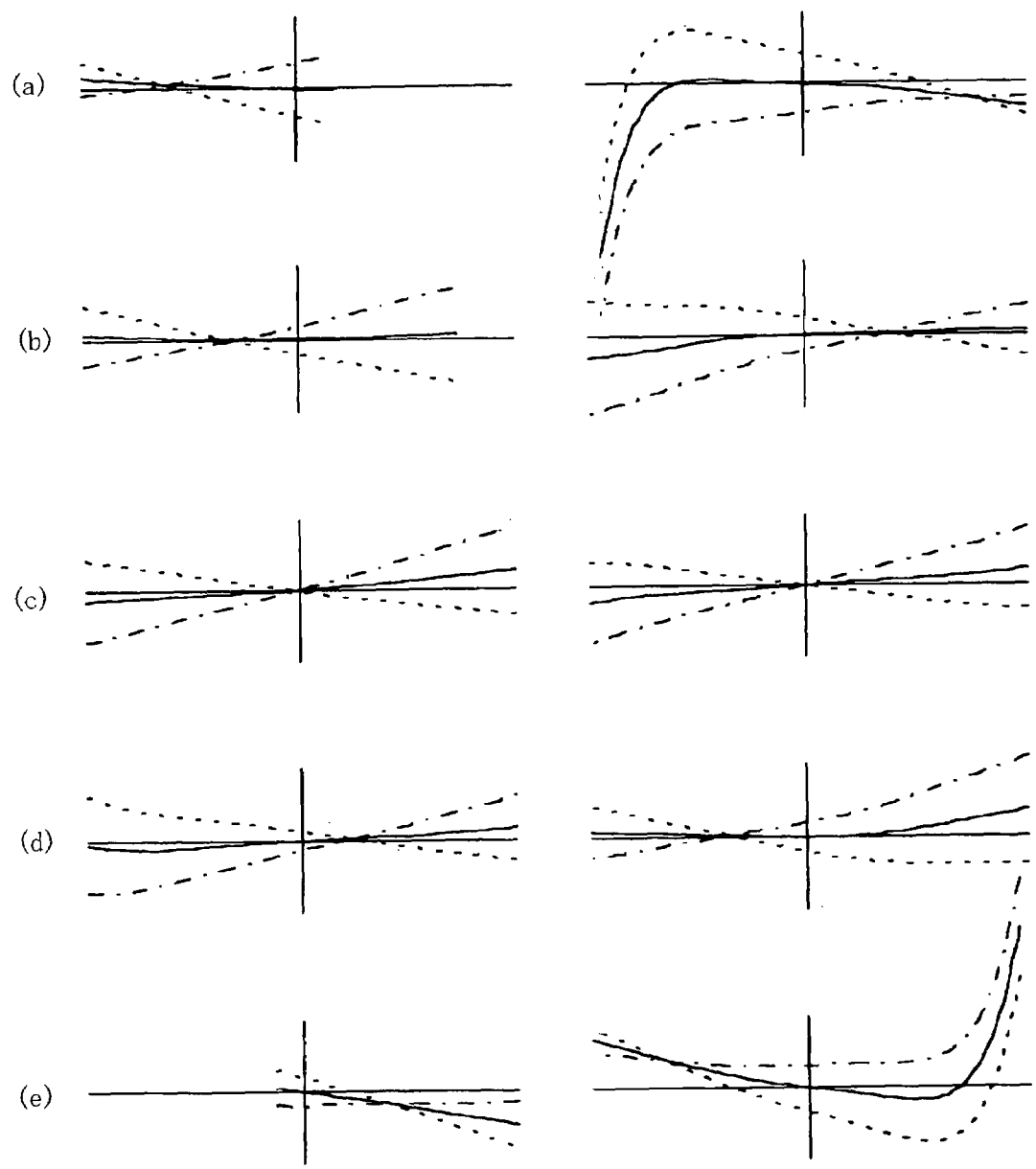
FIG. 16 is a lateral aberration diagram based on the design values of the image display device constituting a second working configuration of the present invention. (a) indicates a case in which the angle of view (X, Y)=(−6.66°, 5.00°), (b) indicates a case in which the angle of view (X, Y)=(−3.33°, 2.50°), (c) indicates a case in which the angle of view (X, Y)=(0.00°, 0.00°), (d) indicates a case in which the angle of view (X, Y)=(3.33°, −2.50°), and (e) indicates a case in which the angle of view (X, Y)=(6.66°, −5.00°). The figures on the left side indicate lateral aberration in the Y direction, and the figures on the right side indicate lateral aberration in the X direction. Furthermore, the solid lines indicate light with a wavelength of 461.259 nm, the broken lines indicate light with a wavelength of 471.259 nm, and the one-dot chain lines indicate light with a wavelength of 451.259 nm. With regard to the vertical axis, as in FIG. 3, the upper end of the axis is 0.0250, and the lower end is −0.250.

Here, FIG. 16 shows a lateral aberration diagram used to express the image focusing performance of the optical system of the image display device constituting the present working configuration in a case where it is assumed that the actual HOE 6 maintains the design values defined in Table 10 "as is." Here, the lateral aberration values for the center wavelength of 461 nm and the wavelengths of 471 nm and 451 nm which are wavelengths of ±10 nm with respect to this center wavelength are shown simultaneously in one diagram. It is seen from FIG. 16 that in a case where the HOE 6 has the characteristics of the design values, there is little lateral chromatic aberration throughout the entire region of the angle of view, so that the image focusing performance is superior.

Figure 17:
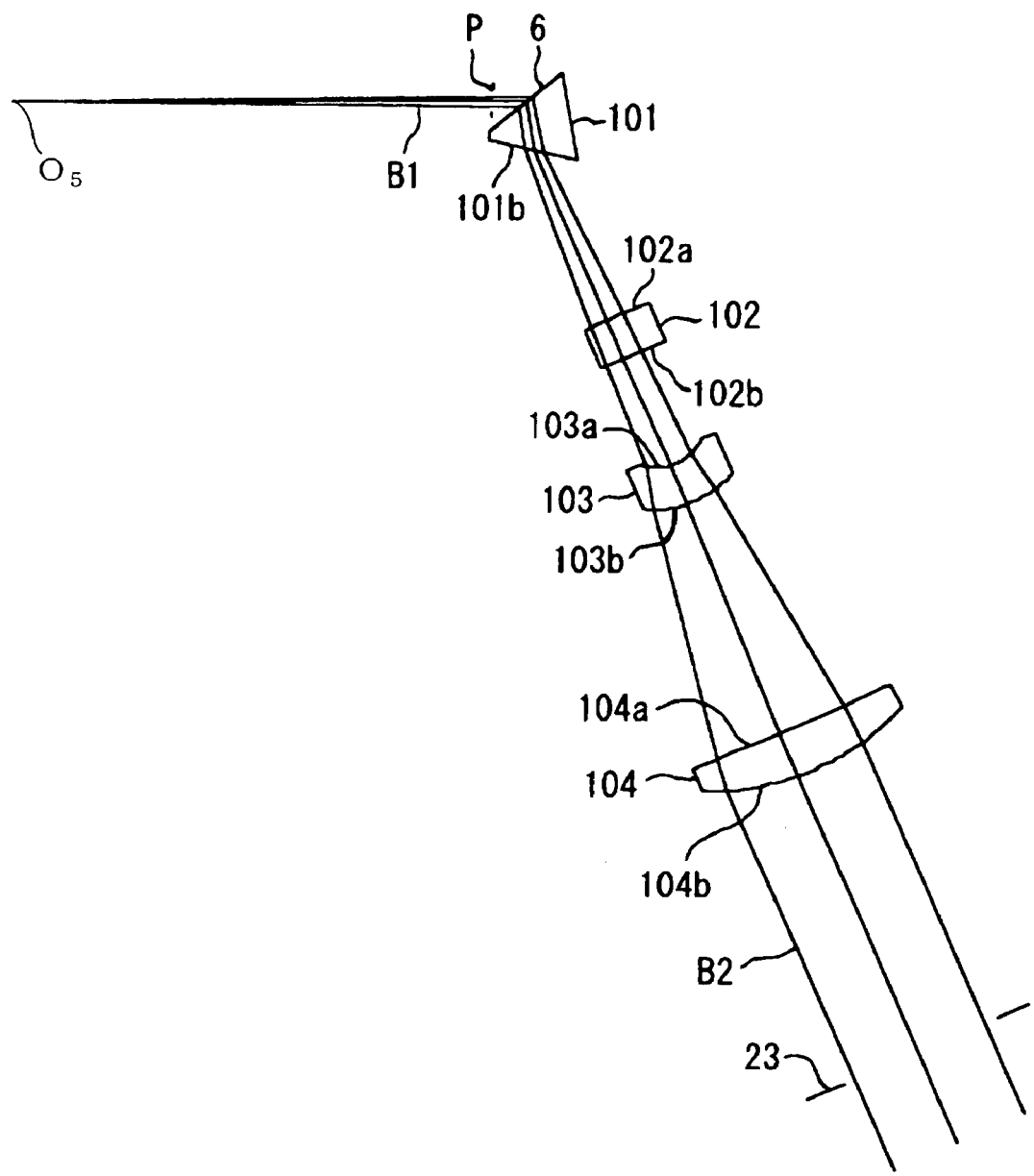
FIG. 17 is an optical path diagram showing the essential parts of the exposure optical system that is used to expose the reflective type holographic optical element in the image display device constituting a second working configuration of the present invention.

The exposure optical system used in the actual manufacture of the reflective type HOE 6 defined in Table 10 was designed by the same method as that used to design the exposure optical system used in the actual manufacture of the reflective type HOE 6 defined in Table 1 in relation to the first concrete example of the first working configuration described above. An optical path diagram of the essential parts of this exposure optical system is shown in FIG. 17. In FIG. 17, elements that are the same as elements in FIG. 4 or that correspond to elements in FIG. 4 are labeled with the same symbols, and a redundant description is omitted. Furthermore, in this working configuration, the position of the first light source is the position shown at $O_5$.

The optical system shown in FIG. 17 has a construction in which a single prism 101 coated with a photosensitive material such as an emulsion that forms a reflective type HOE 6, a single cylindrical lens 102 which has a curvature in the plane of the page in FIG. 17, but which is planar in the cross section perpendicular to the plane of the page, and two spherical lenses 103 and 104, are eccentrically disposed. However, since the spherical lens 103 and spherical lens 104 are coaxial, the total number of axes of eccentricity of the lenses is two. Furthermore, only a shift is used in the eccentricity of the respective lenses of the lens group; tilting is not used. Thus, the optical system shown in FIG. 17 has a relatively simple construction.

Furthermore, although this is not shown in the figure, the prism 101 is constructed from a small part 5d that constitutes one portion of the plate-form part 5 shown in FIG. 1, a holding member that holds this small part 5d, and a filling material that fills the space between these parts, like the prism 21 shown in FIGS. 4 and 5.

An apparatus in which the optical system shown in FIG. 17 is disposed in the hologram exposure apparatus shown in FIG. 6 instead of the prism 21 and lens 22 can be used as the hologram exposure apparatus that exposes the reflective type HOE 6 during the manufacture of this reflective type HOE 6 using the optical system shown in FIG. 17. However, in this working configuration, since the distance Rd is set at 146 mm, a convex lens is coaxially disposed, for example, between the mirror 41 and diaphragm 42 in accordance with this distance. Furthermore, it goes without saying that the positions and angles of the parts of the elements 43 through 47 in FIG. 6 are altered in order to satisfy the angular relationship between light beams B1 and B2 in FIG. 17.

Here, the various quantities used for ray tracing of the optical system shown in FIG. 17 are shown in Table 12 below. The order of the optical planes (order of the plane numbers) is the order from the first light source (light source on the side of the exit pupil P of the image combiner 1) to the second light source.

In Table 12, the symbol S1 of the plane number 1 indicates the first light source. The various coefficients of the hologram plane of plane number 3 are the same as in Table 10 above. The incident pupil diameter must be a diameter that satisfies the requirement for the effective diameter of the hologram plane; here, this diameter is 6.2. The wavelength used for ray tracing is the exposure wavelength of 476 nm.

TABLE 12

| Plane number (symbol) | Curvature radius | Medium nd | vd |
|---|---|---|---|
| 1 (S1) | INFINITY | | |
| 2 (P) | INFINITY | | |
| 3 (6) | INFINITY | 1.596229 | 40.4 |

Hologram plane:
Definition of two light beams

| HV1: | VIR | HV2: | VIR | | |
|---|---|---|---|---|---|
| HX1: | $0.000000 \times 10^{+00}$ | HY1: | $-.173228 \times 10^{+10}$ | HZ1: | $-.135831 \times 10^{+10}$ |
| HX2: | $0.000000 \times 10^{+00}$ | HY2: | $0.300000 \times 10^{+06}$ | HZ2: | $-.213231 \times 10^{+07}$ |

Phase coefficient

| C2: | $6.4562 \times 10^{-01}$ | C3: | $-7.7935 \times 10^{-03}$ | C5: | $-7.6999 \times 10^{-03}$ |
|---|---|---|---|---|---|
| C7: | $-1.6780 \times 10^{-04}$ | C9: | $-1.0821 \times 10^{-04}$ | C10: | $-1.3111 \times 10^{-05}$ |
| C12: | $8.8526 \times 10^{-06}$ | C14: | $6.7304 \times 10^{-06}$ | C16: | $-2.0346 \times 10^{-05}$ |
| C18: | $-1.6415 \times 10^{-05}$ | C20: | $3.3963 \times 10^{-07}$ | C21: | $1.2269 \times 10^{-05}$ |
| C23: | $1.0758 \times 10^{-05}$ | C25: | $1.0457 \times 10^{-05}$ | C27: | $-8.4145 \times 10^{07}$ |
| C29: | $2.9982 \times 10^{-06}$ | C31: | $3.1652 \times 10^{-07}$ | C33: | $-1.8137 \times 10^{-06}$ |
| C35: | $2.5814 \times 10^{-08}$ | C36: | $-2.0185 \times 10^{-06}$ | C38: | $-1.7766 \times 10^{-06}$ |
| C40: | $-1.1308 \times 10^{06}$ | C42: | $-1.3573 \times 10^{-06}$ | C44: | $5.1578 \times 10^{-08}$ |
| C46: | $-2.2024 \times 10^{-07}$ | C48: | $3.4870 \times 10^{-08}$ | C50: | $3.5469 \times 10^{-07}$ |
| C52: | $7.2325 \times 10^{-07}$ | C54: | $-1.5335 \times 10^{-08}$ | C55: | $1.1275 \times 10^{-07}$ |
| C57: | $1.2705 \times 10^{-07}$ | C59: | $2.2363 \times 10^{-08}$ | C61: | $-5.0658 \times 10^{-08}$ |
| C63: | $-9.4917 \times 10^{-08}$ | C65: | $1.8712 \times 10^{-09}$ | | |

| Plane number (symbol) | Curvature radius | Medium nd | vd |
|---|---|---|---|
| 4 (101b) | INFINITY | | |
| 5 (102a) | | | |
| Cylindrical lens | | | |
| Y direction | 215.90872 | 1.516800 | 64.103 |
| X direction | INFINITY | | |
| 6 (102b) | INFINITY | | |
| 7 (103a) | -13.81913 | 1.516800 | 64.103 |
| 8 (103b) | -29.00541 | | |
| 9 (104a) | -1172.23816 | 1.516800 | 64.103 |
| 10 (104b) | -72.71635 | | |

Furthermore, with regard to the positional relationship of the respective optical planes in the optical system shown in FIG. 17, the absolute positions of the centers of the respective optical planes with the center of the third plane (plane number 3=symbol 6 in FIG. 17; hologram plane) taken as the origin (X, Y, Z)=(0, 0, 0), and the amounts of rotation of these planes about the X-axis (values measured with the counterclockwise direction taken as the positive direction), are shown in Table 13 below.

TABLE 13

| Plane No. (symbol) | X coordinate value | Y coordinate value | Z coordinate value | Rotational angle about X axis [degree] |
|---|---|---|---|---|
| 2 (P) | 0.00000 | -7.84782 | -6.19772 | 51.7005 |
| 3 (6) | 0.00000 | 0.00000 | 0.00000 | 0.0000 |

TABLE 13-continued

| Plane No. (symbol) | X coordinate value | Y coordinate value | Z coordinate value | Rotational angle about X axis [degree] |
|---|---|---|---|---|
| 4 (101b) | 0.00000 | -6.81808 | 12.00000 | -50.0000 |
| 5 (102a) | 0.00000 | -17.64076 | 63.57146 | -14.6593 |
| 6 (102b) | 0.00000 | -20.6776 | 75.18083 | -14.6593 |
| 7 (103a) | 0.00000 | -30.39783 | 106.67695 | -14.6593 |
| 8 (103b) | 0.00000 | -33.43468 | 118.28632 | -14.6593 |
| 9 (104a) | 0.00000 | -51.1291 | 185.92939 | -14.6593 |
| 10 (104b) | 0.00000 | -54.4648 | 198.68124 | -14.6593 |

Figure 18:
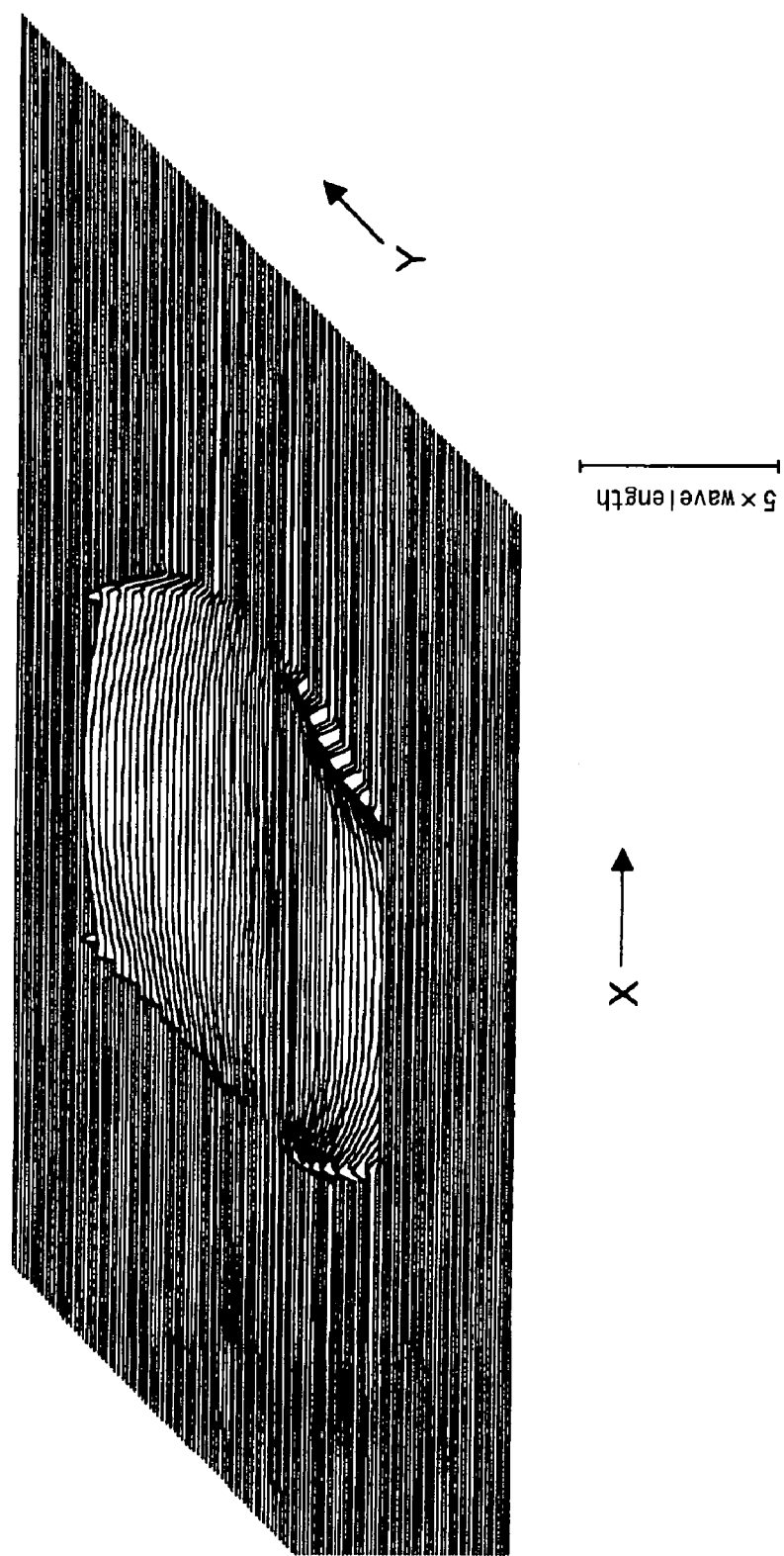
FIG. 18 is a residual wave front aberration diagram of the optical system shown in FIG. 17.

FIG. 18 shows a wave front aberration diagram at the exit pupil plane (i.e., the plane 23 shown in FIG. 17) according to the ray tracing of this optical system shown in FIG. 17. As is seen from FIG. 18, there is an extremely good correction of 0.3 λ in terms of RMS.

Next, the performance of the reflective type HOE 6 exposed by the hologram exposure apparatus including the optical system shown in FIG. 17 described above will be determined. For this purpose, it is necessary to compare the optical performance of the optical system of the image display device in a case where the reflective type HOE 6 exposed by the hologram exposure apparatus containing the optical system shown in FIG. 17 is incorporated into the optical system of the image display device of the present working configuration instead of the design reflective type HOE 6 having the design values defined in Table 10, with the optical performance of the optical system of this image display device in a case where it is assumed that the reflective type HOE 6 having the design values defined in Table 10 is incorporated "as is."

Figure 19:
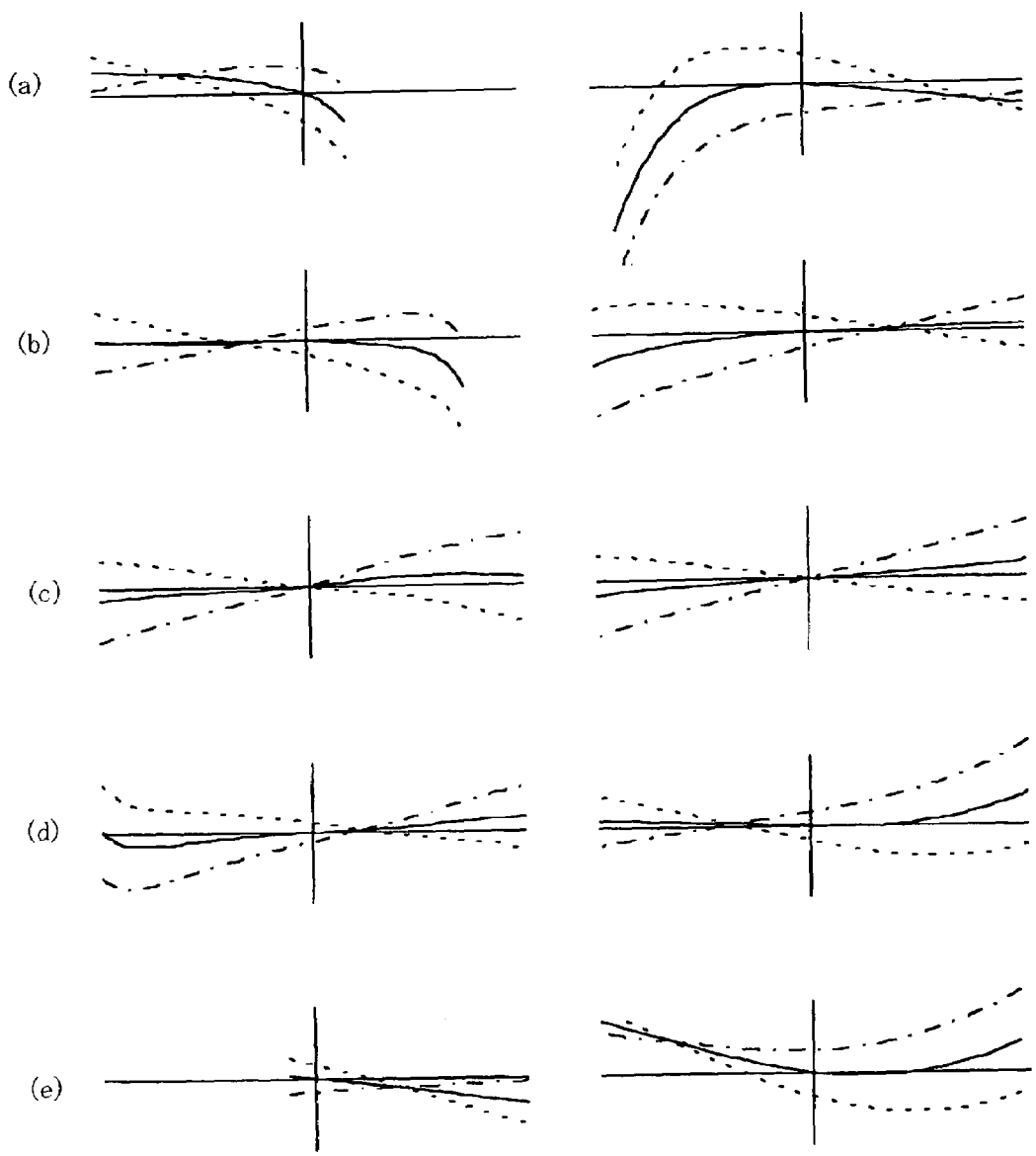
FIG. 19 is a lateral aberration diagram of the image display device constituting a second working configuration of the present invention, incorporating a reflective type holographic optical element exposed using the optical system shown in FIG. 17. (a) indicates a case in which the angle of view (X, Y)=(−6.66°, 5.00°), (b) indicates a case in which the angle of view (X, Y)=(−3.33°, 2.50°), (c) indicates a case in which the angle of view (X, Y)=(0.00°, 0.00°), (d) indicates a case in which the angle of view (X, Y)=(3.33°, −2.50°), and (e) indicates a case in which the angle of view (X, Y)=(6.66°, −5.00°). The figures on the left side indicate lateral aberration in the Y direction, and the figures on the right side indicate lateral aberration in the X direction. Furthermore, the solid lines indicate light with a wavelength of 461.259 nm, the broken lines indicate light with a wavelength of 471.259 nm, and the one-dot chain lines indicate light with a wavelength of 451.259 nm. With regard to the vertical axis, as in FIG. 3, the upper end of the axis is 0.0250, and the lower end is −0.250.
Figure 20:
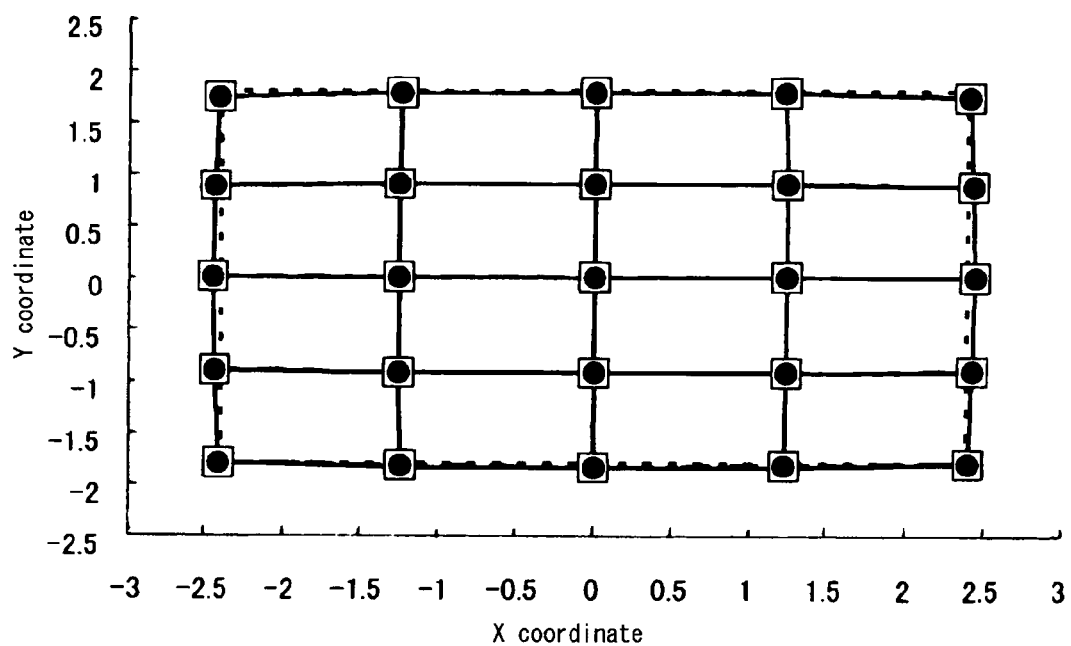
FIG. 20 is a diagram which shows a comparison between the distortion in the case of the original design values and the distortion in the case of the incorporation of a reflective type holographic optical element exposed using the optical system shown in FIG. 17, for the image display device constituting a second working configuration of the present invention. The broken line indicates the size of the picture elements, the line connecting black circles indicates the design values of the playback system, and the line connecting white squares indicates the values of the playback system using an HOE following exposure.

This can be accomplished by performing optimization with the phase function of the HOE 6 as a variable so that the residual aberration of the optical system shown in FIG. 17 is completely 0λ in terms of RMS, and evaluating the performance with this coefficient applied to the lens data of the optical system of the image display device shown in Table 10. FIG. 19 shows a lateral aberration diagram of the optical system of the image display device incorporating an HOE 6 following exposure simulated by this method; the distortion of this optical system (distortion at the surface of the display part of the image display element 2) is shown in FIG. 20.

The lateral aberration shown in FIG. 19 shows good results that are more or less similar to the lateral aberration shown in FIG. 16. Furthermore, both distortions are more or less comparable. Thus, the performance of the reflective type HOE 6 exposed using the optical system shown in FIG. 17 is comparable to the performance of the design reflective type HOE 6 defined in Table 1, and is favorable.

Respective working configurations of the present invention, and concrete examples of these working configurations, were described above. However, the present invention is not limited to these working configurations or concrete examples.

For instance, the respective working configurations described above were examples in which a head-mounted image display device was constructed using the image combiner of the present invention. However, the respective image combiners 1 used in the respective working configurations described above could also be constructed so as to allow mounting on the ocular lens parts of camera view finders, microscopes and binoculars, or these image combiners could also be incorporated into cameras, microscopes, binoculars, or the like.

Furthermore, the respective working configurations described above were examples in which the present invention was applied to a see-through type head-mounted image display device; however, the present invention can also be applied to image display devices that are not of the see-through type. In this case, the image display devices of the respective working configurations described above can be constructed so that light from the outside world is not incident on the image combiner 1. In such a case, since the part constituting the image combiner 1 does not superimpose two images, this part cannot be called an image combiner; instead, this part constitutes a light conducting part that conducts light from the image display element 2 to the eye of the user. In this case, the lower portion of the plate-form part (portion below the HOE 6) in the image combiner 1 may be removed. For example, such an image display device that is not of the see-through type can be installed inside the flipper part of a portable telephone in the same manner as in the case of Japanese Patent Application Kokai No. 2001-264682.

The invention claimed is:

1. An image combiner which comprises a reflective type holographic optical element, and which superimposes light from an image display unit on light passing through a main body of the image combiner, wherein:
   the reflective type holographic optical element has a third-order or higher phase conversion action that depends on a position on a hologram plane, and
   a distance Rd is substantially greater than a distance Pd, where Rd is a distance calculated in air between (i) a light source located on a side of eyes of an observer during end-use of two light sources that are used to expose the reflective type holographic optical element during manufacture thereof and (ii) the hologram plane of the reflective type holographic optical element, and
   where Pd is a distance calculated in air between an exit pupil of the image combiner and the hologram plane of the reflective type holographic optical element.

2. The image combiner according to claim 1, wherein the distance Rd is at least twice the distance Pd.

3. The image combiner according to claim 2, wherein the distance Rd is at least 100 mm.

4. An image display device comprising:
   the image combiner according to claim 3; and
   the image display, unit;
   wherein at least a portion of the image display device containing the image combiner is mounted on the observer during use.

5. An image display device comprising:
   the image combiner according to claim 2; and
   the image display, unit;
   wherein at least a portion of the image display device containing the image combiner is mounted on the observer during use.

6. The image combiner according to claim 1, wherein the distance Rd is at least 100 mm.

7. An image display device comprising:
   the image combiner according to claim 6; and
   the image display, unit;
   wherein at least a portion of the image display device containing the image combiner is mounted on the observer during use.

8. An image display device comprising:
   the image combiner according to claim 1; and
   the image display, unit;
   wherein at least a portion of the image display device containing the image combiner is mounted on the observer during use.

9. An image display device comprising:
   an image display unit; and
   a light conducting part, which includes a reflective type holographic optical element, and which conducts light from the image display unit to eyes of a user;
   wherein:
   the reflective type holographic optical element has a third-order or higher phase conversion action that depends on a position on a hologram plane, and
   a distance Rd is substantially greater than a distance Pd, where Rd is a distance calculated in air between (i) a light source located on a side of eyes of an observer during end-use of two light sources that are used to expose the reflective type holographic optical element during manufacture thereof and (ii) the hologram plane of the reflective type holographic optical element, and
   where Pd is a distance calculated in air between an exit pupil of the image combiner and the hologram plane of the reflective type holographic optical element.

10. The image display device according to claim 9, wherein the distance Rd is at least twice the distance Pd.

11. The image display device according to claim 10, wherein the distance Rd is at least 100 mm.

12. The image display device according to claim 9, wherein the distance Rd is at least 100 mm.

* * * * *